US010175713B1

United States Patent
Howell et al.

(10) Patent No.: US 10,175,713 B1
(45) Date of Patent: Jan. 8, 2019

(54) ACCELERATING AND BRAKING DEVICE AND METHOD FOR A VEHICLE

(71) Applicant: Howell Ventures Ltd., New Brunswick (CA)

(72) Inventors: Keith Howell, New Brunswick (CA); Timothy E. Smith, New Brunswick (CA); Dane N. Millar, New Brunswick (CA)

(73) Assignee: HOWELL VENTURES LTD. (CA)

( * ) Notice: Subject to any disclaimer, the term of this patent is extended or adjusted under 35 U.S.C. 154(b) by 0 days.

(21) Appl. No.: 15/184,970

(22) Filed: Jun. 16, 2016

Related U.S. Application Data

(60) Provisional application No. 62/180,409, filed on Jun. 16, 2015, provisional application No. 62/196,557, filed on Jul. 24, 2015.

(51) Int. Cl.
  *G05G 9/02* (2006.01)
  *G05G 1/01* (2008.04)
  *B60K 26/02* (2006.01)
  *B60T 7/04* (2006.01)
  *B60T 7/08* (2006.01)
  *G05G 1/04* (2006.01)

(52) U.S. Cl.
  CPC .............. *G05G 9/02* (2013.01); *B60K 26/02* (2013.01); *B60T 7/042* (2013.01); *B60T 7/085* (2013.01); *G05G 1/01* (2013.01); *G05G 1/04* (2013.01); *B60K 2026/028* (2013.01); *B60T 2270/82* (2013.01); *B60Y 2400/402* (2013.01)

(58) Field of Classification Search
  None
  See application file for complete search history.

(56) References Cited

U.S. PATENT DOCUMENTS

| | | | |
|---|---|---|---|
| 4,476,954 A | 10/1984 | Johnson | |
| 4,587,865 A | 5/1986 | Winner | |
| 4,924,960 A | 5/1990 | Crill | |
| 4,993,509 A * | 2/1991 | Howell | B60W 30/18 180/315 |

(Continued)

OTHER PUBLICATIONS http://www.electricrider.com/v/vspfiles/docs/CaV3UserGuide.pdf.

(Continued)

*Primary Examiner* — Ramya P Burgess
*Assistant Examiner* — Timothy Hannon
(74) *Attorney, Agent, or Firm* — Frijouf, Rust & Pyle, P.A.

(57) ABSTRACT

An accelerating and braking device is disclosed for a vehicle. The accelerating and braking device includes a support tube pivotably coupled adjacent to the steering column. A brake tube links the control tube with the brake pedal for activating and deactivating the brake pedal. A position sensor is coupled to the control tube. A control engaging the position sensor for producing a variable signal output from the position sensor during rotation of the control. The position sensor electrically coupled to the electronic control module. A first rotational displacement of the position sensor causing an increase in velocity of the vehicle. A second rotational displacement of the position sensor causing a decrease in velocity of the vehicle. A first spring and a second spring engaging the control for causing the second rotational displacement and the decrease in velocity of the vehicle.

23 Claims, 30 Drawing Sheets

(56) References Cited

U.S. PATENT DOCUMENTS

| 4,998,983 | A | * | 3/1991 | Ruprecht | B60W 30/18 |
|---|---|---|---|---|---|
| | | | | | 477/209 |
| 5,086,870 | A | | 2/1992 | Bolduc | |
| 5,321,980 | A | * | 6/1994 | Hering | F02D 9/02 |
| | | | | | 123/361 |
| 6,494,115 | B1 | | 12/2002 | Haugen et al. | |
| 6,622,589 | B1 | * | 9/2003 | Pino | F02D 11/106 |
| | | | | | 188/73.31 |
| 7,171,869 | B1 | | 2/2007 | Marquis et al. | |
| 2003/0051571 | A1 | * | 3/2003 | Staker | B60K 26/021 |
| | | | | | 74/514 |
| 2016/0052390 | A1 | * | 2/2016 | Park | B60K 26/02 |
| | | | | | 74/473.31 |
| 2016/0334829 | A1 | * | 11/2016 | Kaijala | G05G 1/38 |

OTHER PUBLICATIONS http://citeseerx.ist.psu.edu/viewdoc/downoad?doi=10.1.1.117.4223&rep=rep1&type=pdf.
http://bodybuilder.navistar.com/General/Documents/engine/EngineThrottleControlInstructions.pdf.
http://www.kempf-usa.com/images/Documentation/Kempf_Darios_US_web.pdf.

* cited by examiner

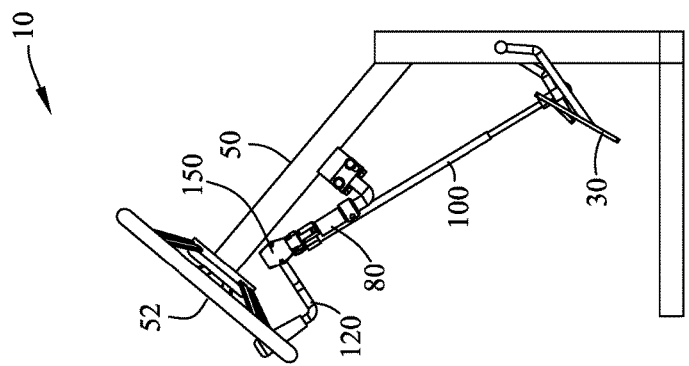
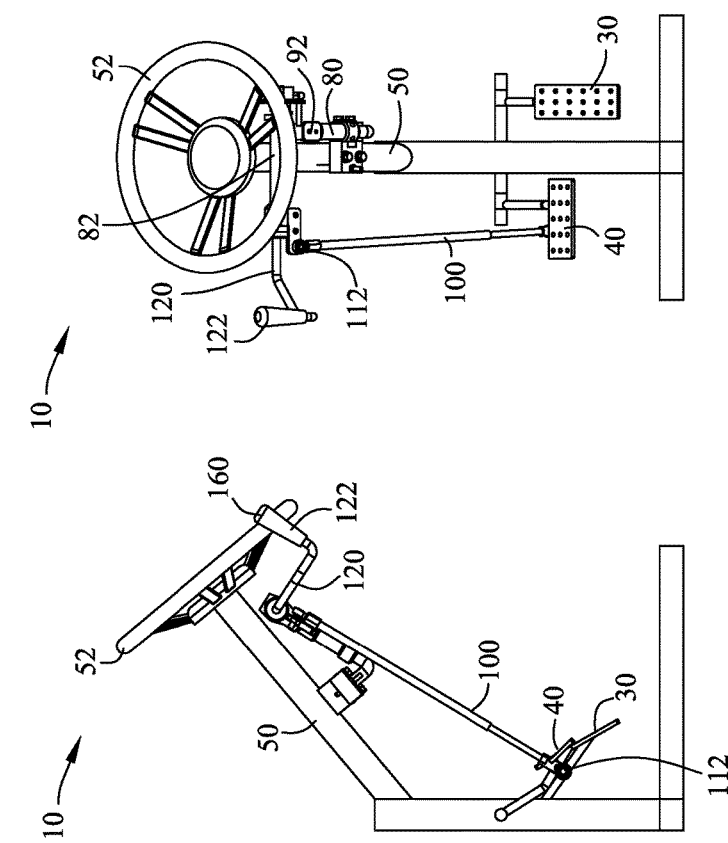
FIG. 5
FIG. 3
FIG. 4

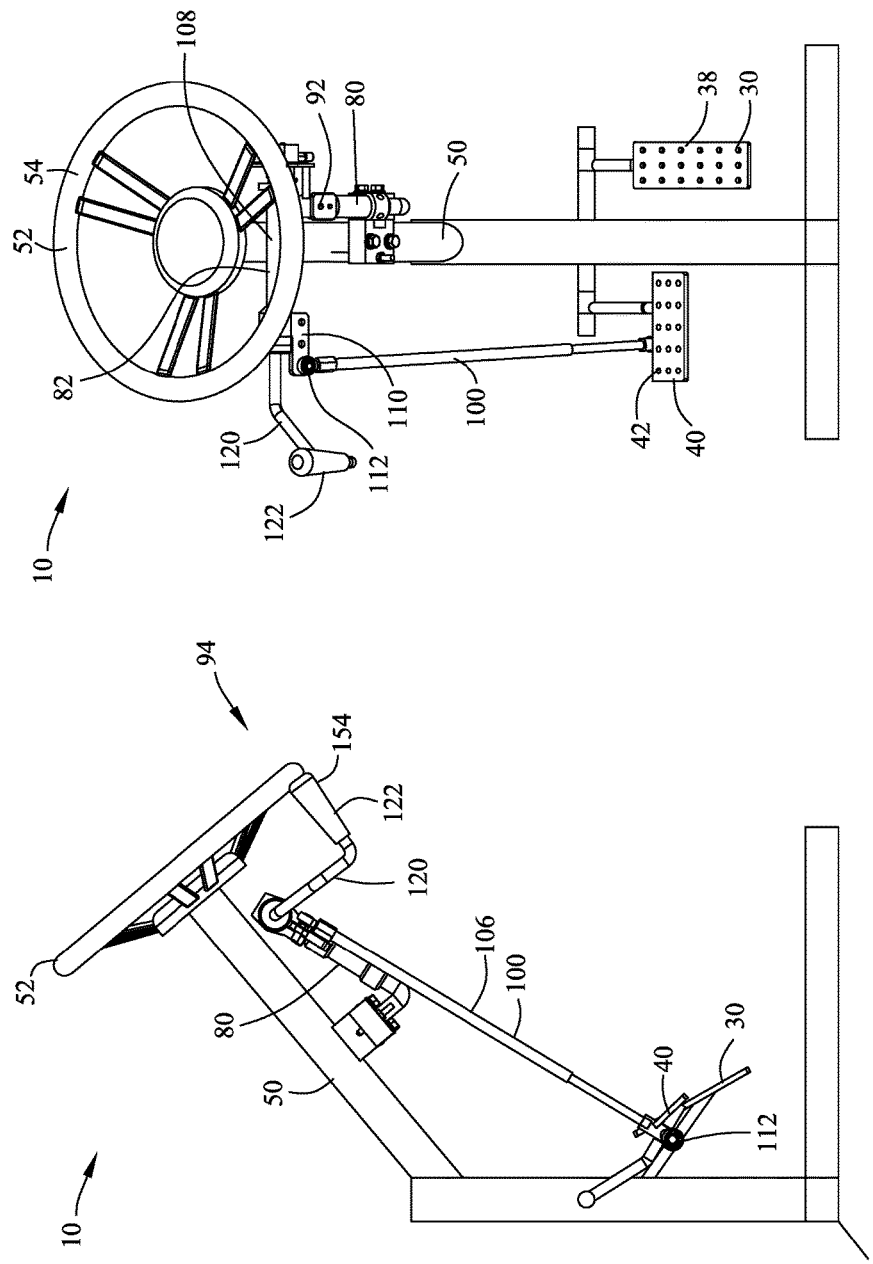

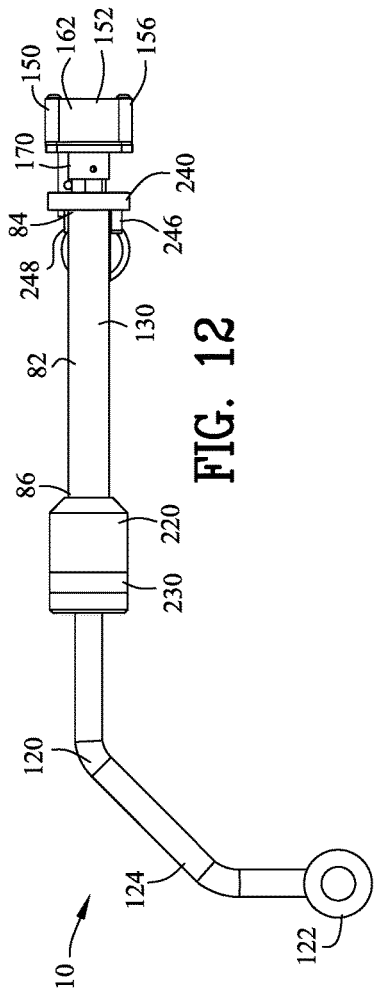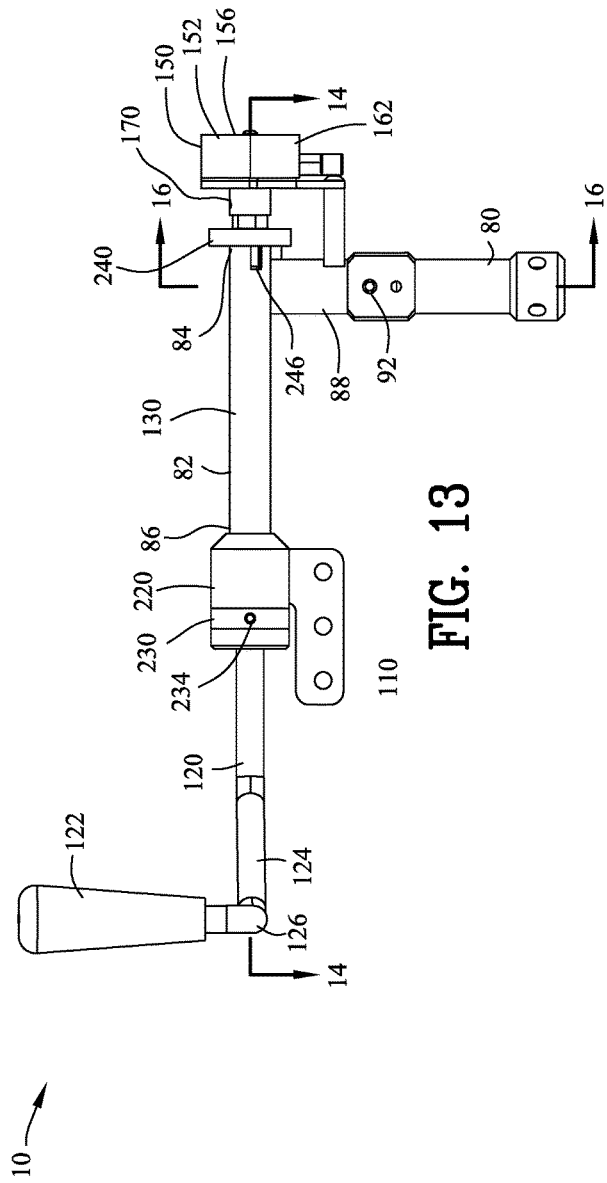

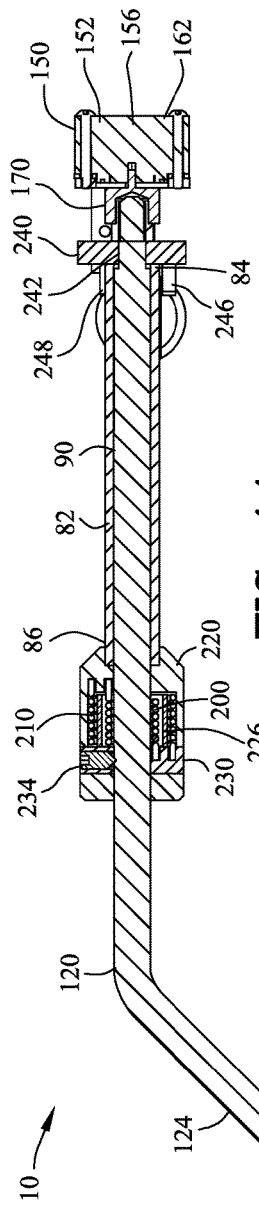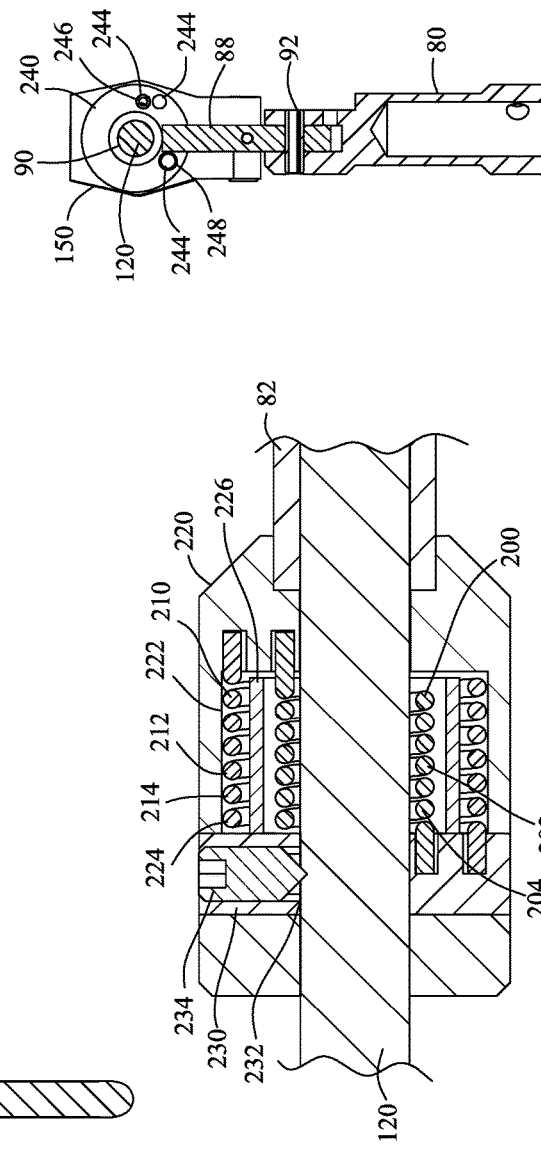

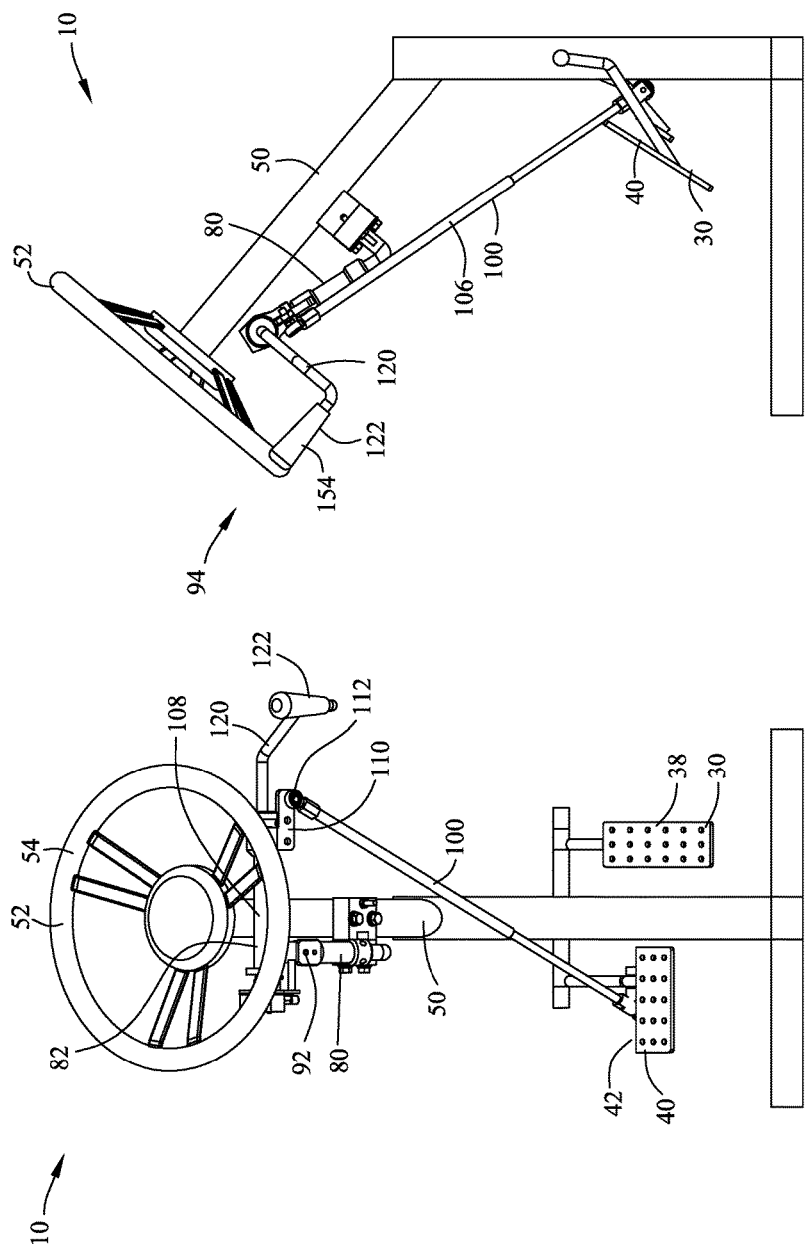

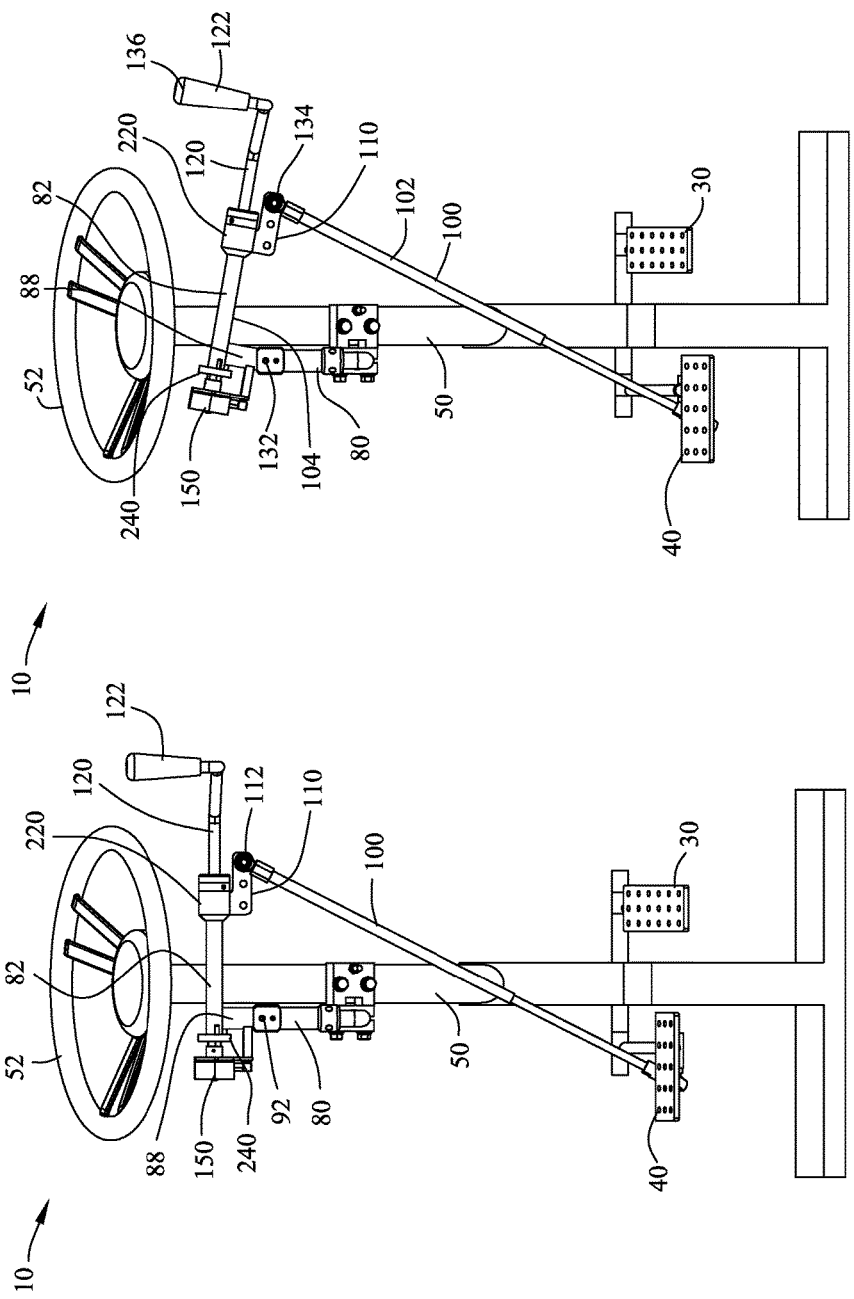

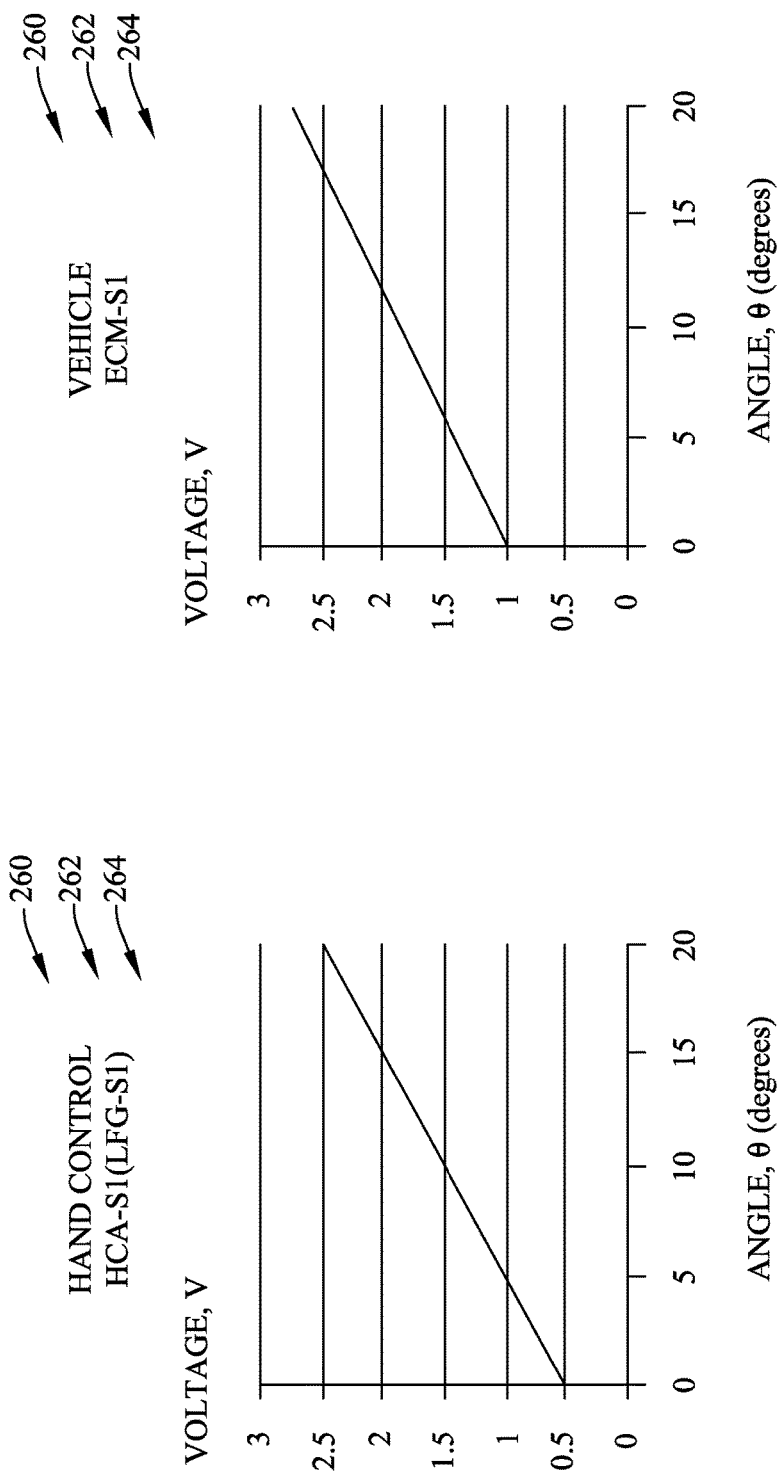

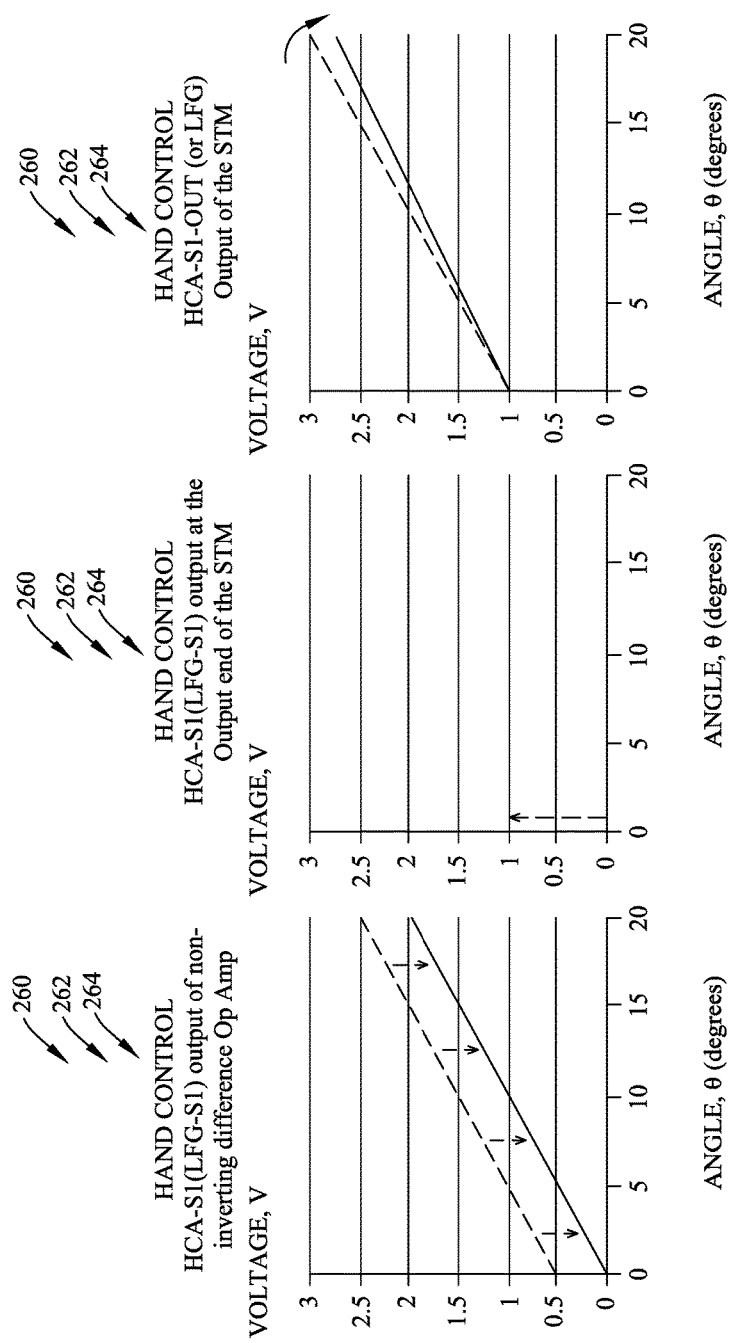

ACCELERATING AND BRAKING DEVICE AND METHOD FOR A VEHICLE

CROSS-REFERENCE TO RELATED APPLICATIONS

This application claims benefit of U.S. Patent Provisional application No. 62/180,409 filed Jun. 16, 2015. All subject matter set forth in provisional application No. 62/180,409 is hereby incorporated by reference into the present application as if fully set forth herein.

This application claims benefit of U.S. Patent Provisional application No. 62/196,557 filed Jul. 24, 2015. All subject matter set forth in provisional application No. 62/196,557 is hereby incorporated by reference into the present application as if fully set forth herein.

BACKGROUND OF THE INVENTION

Field of the Invention

This invention relates to a vehicle device and method and more particularly to an accelerating and braking device and method for a vehicle.

Background of the Invention

The development of systems to enable handicapped persons to operate motor vehicles has evolved from the simplest of mechanical contrivances to more complex mechanical/electrical/electronic systems. Modern automotive technology has replaced the simple mechanical systems, such as the throttle, with "fly by wire" systems in which a mechanical system control movement is translated to an electronic signal and sent to an on-board control module, which in turn translates the received electronic signal into the appropriate signal for the mechanical function to achieve the control operation chosen by the operator.

Although these systems are reliable, they must incorporate various error detection algorithms in order to assure accurate completion of the operation requested by the operator. Likewise, components which may be subject to failure must be provided with redundancy.

There have been many in the prior art who have attempted to solve these problems with varying degrees of success. None, however completely satisfies the requirements for a complete solution to the aforestated problem. The following U.S. patents are attempts of the prior art to solve this problem.

U.S. Pat. No. 4,476,954 to Johnson, et al. discloses a remote controller for controlling the throttle, brake and steering mechanism of a conventional motor vehicle, with the remote controller being particularly advantageous for use by severely handicapped individuals. The controller includes a remote manipulator which controls a plurality of actuators through interfacing electronics. The remote manipulator is a two-axis joystick which controls a pair of linear actuators and a rotary actuator, with the actuators being powered by electric motors to effect throttle, brake and steering control of a motor vehicle adapted to include the controller. The controller enables the driver to control the adapted vehicle from anywhere in the vehicle with one hand with minimal control force and range of motion. In addition, even though a conventional vehicle is adapted for use with the remote controller, the vehicle may still be operated in the normal manner.

U.S. Pat. No. 4,587,865 to Winner discloses a gas feed safety device for right leg amputees in the form of a socket member adapted to be attached to the floor or hump of an automobile. An elongate stop member having a depending arm adapted removably to fit in the socket member is provided to hold the foot stop member spaced above an accelerator pedal and to hold the member rigidly in place.

U.S. Pat. No. 4,924,960 to Crill discloses a highly reliable remote control system that is particularly well adapted for controlling a vehicle, and, more particularly, for controlling the throttle, brake, steering and transmission mechanisms of a motor vehicle. The system includes a remote manipulator that enables control of the adapted vehicle remotely with one hand and with minimal control force and range of motion, with the manipulator controlling a plurality of actuators through interfacing redundant digital/analog electronics. The remote manipulator may be a bilateral input device utilizing a plurality of pressure sensors, but could also be a two-axis joystick, with the manipulator, in conjunction with an adjacently positioned transmission controller, controlling linear and rotary actuators powered by electric motors to effect throttle, brake, steering and transmission control of a motor vehicle adapted to include the remote control system as a part of the overall vehicle controlling system.

U.S. Pat. No. 5,086,870 to Bolduc discloses a remotely controlled system for the operation of a vehicle wherein a limited physical input is translated into desired vehicle movement. The invention uses a unitary manipulator with two axes of movement to direct the steering, acceleration and braking functions of the vehicle. The surplus current available from the main battery of the vehicle powers the control system. The steering function of the invention involves the conversion of a mechanical input into a frequency-based signal which is processed by a primary steering microprocessor. This microprocessor in turn directs a frequency-based motor controller to operate a motor which rotates a steering shaft of the vehicle. The acceleration and braking functions operate in the same way, wherein a primary acceleration microprocessor acts upon a frequency-based signal to direct a frequency-based motor which is connected to the accelerator and brake pedals of the vehicle. In order to provide a smooth transition from the manipulator input to motor operation, the motors of the present invention are preferably stepper motors. The invention can be disengaged to permit standard operation of the steering wheel and accelerator and brake pedals of the vehicle.

U.S. Pat. No. 5,321,980 to Hering, et al. discloses an integrated throttle position validation sensor including electrically independent throttle position and position validation components responsive to a single mechanical input applied to a protective sensor housing. By suitable mounting to the throttle control device, the mechanical input corresponds to accelerator pedal position. Within the sensor housing a potentiometer moves with the mechanical input whereby a variable voltage throttle position signal is generated. Also, within the housing a separate validation switch responsive to the mechanical input provides an independent representation of throttle control device position in the form of, for example, a bi-state validation signal. The sensor integrates previous separate throttle control position and position validation functions into a single environmentally secure housing which requires no calibration. The integrated sensor is more reliable and less costly than previously available separate throttle control and idle validation functions U.S. Pat. No. 6,494,115 to Haugen, et al. discloses a left foot accelerator pedal device which allows persons lacking sufficient functionality of the right foot or right leg to operate a motor vehicle accelerator pedal using their left foot. The device incorporates an accelerator pedal activator which engages the motor vehicle accelerator pedal and is operably attached by a main shaft to a left side accelerator pedal. The main shaft is supported by a base unit which is removably attached to a base plate affixed to the vehicle floor. By depressing left side accelerator pedal a person lacking functionality of the right foot may operate the vehicle while the device may be easily removed from base plate allowing a person of normal functionality to operate the vehicle.

U.S. Pat. No. 7,171,869 to Marquis, et al. discloses a left foot accelerator apparatus comprising a shaft housing secured to the top surface of one end of an anchor plate, a shaft rotatably supported within the shaft housing and a left foot pedal moveably mounted to the shaft between a left end of the shaft and the shaft housing. The shaft operatively connects the left foot pedal to an existing accelerator pedal in a vehicle.

Although the aforementioned prior art have contributed to the development of the art of handicapped control systems for vehicles none of these prior art patents have solved the needs of this art.

Therefore, it is an object of the present invention to provide an improved vehicle hand throttle control system.

Another object of this invention is to provide an improved improved vehicle hand throttle control system that is easy for a handicapped person to use.

Another object of this invention is to provide an improved vehicle hand throttle control system which is interfaced with the electronic control systems of modern vehicles.

Another object of this invention is to provide an improved vehicle hand throttle control system that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

A specific embodiment of the present invention is shown in the attached drawings. For the purpose of summarizing the invention, the invention relates to an accelerating and braking device for a vehicle. The vehicle has an accelerator pedal electrically engaging a power system for increasing the velocity of the vehicle. A brake pedal engages a braking system for decreasing the velocity of the vehicle. A steering column supports a steering wheel for altering the direction of the vehicle. An electronic control module is electrically coupled to the accelerator pedal with the power system. The accelerating and braking device comprises a support tube coupled adjacent to the steering column. A control tube extends between a proximal end and a distal end. A control tube bore extends between the proximal end and the distal end of the control tube. A control tube pivot pivotably couples the support tube with the control tube for defining an angular displacement of the control tube relative to the support tube. A brake tube links the control tube with the brake pedal. A descending displacement of the control tube defines a decreasing angular displacement of the control tube relative to the support tube causing an activation of the brake pedal. An ascending displacement of the control tube defines an increasing angular displacement of the control tube relative to the support tube causing a deactivation of the brake pedal. A control arm is rotatably displaced within the control tube bore. A control arm handle is coupled to the control arm for rotatably displacing the control arm relative to the control tube. A position sensor is coupled to the control tube. The control arm engages the position sensor for producing a variable signal output from the position sensor during rotation of the control arm relative to the control tube. The position sensor is electrically coupled to the electronic control module. A first rotational displacement of the position sensor defines a first variable signal output to the electronic control module for causing an increase in velocity of the vehicle. A second rotational displacement of the position sensor defines a second variable signal output of the position sensor causing a decrease in velocity of the vehicle. A first spring engages the control tube and the control arm for rotatably displacing the control arm relative to the control tube and causing the second rotational displacement and the decrease in velocity of the vehicle. A second spring engages the control tube and the control arm for rotatably displacing the control arm relative to the control tube and causing the second rotational displacement and the decrease in velocity of the vehicle.

In one embodiment of the invention, a spring cover sleeve is coupled to the control tube. A spring cover sleeve bore extends into the spring cover sleeve. The first spring defines a first cylindrical coil spring having a first diameter. The second spring defines a second cylindrical coil spring having a second diameter. The first diameter is less than the second diameter for positioning the first spring within the second spring and defining a concentric spring system. The concentric spring system encircles the control arm and is positioned within the spring cover sleeve bore. A tension adjustment collar has a tension collar bore for receiving the control arm and being rotatably displaced relative to the control tube. The concentric spring system is coupled between the spring cover sleeve and the tension adjustment collar for rotatably displacing the control arm relative to the control tube and causing the second rotational displacement in the decrease in velocity of the vehicle.

In another embodiment of the invention, a signal control module is electrically coupled between the position sensor and the electronic control module of the vehicle. The signal control module electrically calibrates the first variable signal output of the first rotational displacement and the second variable signal output of the second rotational displacement.

In another embodiment of the invention, a brake switch is electrically coupled to the signal control module. The brake switch defines a non-activation condition during the brake pedal being not engaged. The brake switch defines an activation condition during the brake pedal being engaged. The activation condition causes the signal control module to produce the second variable signal output of the position sensor regardless of the first variable signal output. The activation condition decreases the velocity of the vehicle.

The invention is also incorporated into the method for accelerating and braking a vehicle. The method comprises the steps of electrically coupling a signal control module between the accelerator pedal and the electronic control module. The position sensor is electrically coupled with the signal control module. The control is coupled with the position sensor for operating the position sensor. The position sensor is calibrated relative to the accelerator pedal with the signal control module.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 3 is a front view of FIG. 1 illustrating the accelerating and braking device at an idle condition and non braking condition;

FIG. 4 is a left side view of FIG. 3;

FIG. 5 is a right side view of FIG. 3;

FIG. 6 is an enlarged view of FIG. 4 illustrating a control arm being rotated to accelerate the vehicle;

FIG. 7 is a front view of FIG. 6;

FIG. 12 is a top view of FIG. 10;

FIG. 13 is a front view of FIG. 10;

FIG. 14 is sectional view along line 14-14 in FIG. 13;

FIG. 15 is an enlarged view of a portion of FIG. 14;

FIG. 16 is a sectional view along line 16-16 in FIG. 13;

FIG. 24 is an enlarged view of FIG. 21 illustrating a control arm being rotated to accelerate the vehicle;

FIG. 25 is a right side view of FIG. 24;

FIG. 26 is an enlarged view of FIG. 21;

FIG. 27 is a view similar to FIG. 26 illustrating the control arm being displaced in a descending direction for applying the brakes;

FIG. 32 is a line graph illustrating the hand control HCA-S1 (LFG-S1);

FIG. 33 is a line graph illustrating the vehicle ECM-S1;

FIG. 34 is a line graph illustrating the hand control HCA-S1 (LFG-S1) output of the noninverting difference Op Amp;

FIG. 35 is a line graph illustrating the hand control HCA-S1 (LFG-S1) output at the output end of the STM;

FIG. 36 is a line graph illustrating the hand output HCA-S1-OUT (or LFG) output at the STM;

Similar reference characters refer to similar parts throughout the several Figures of the drawings.

DETAILED DISCUSSION

Figure 1:
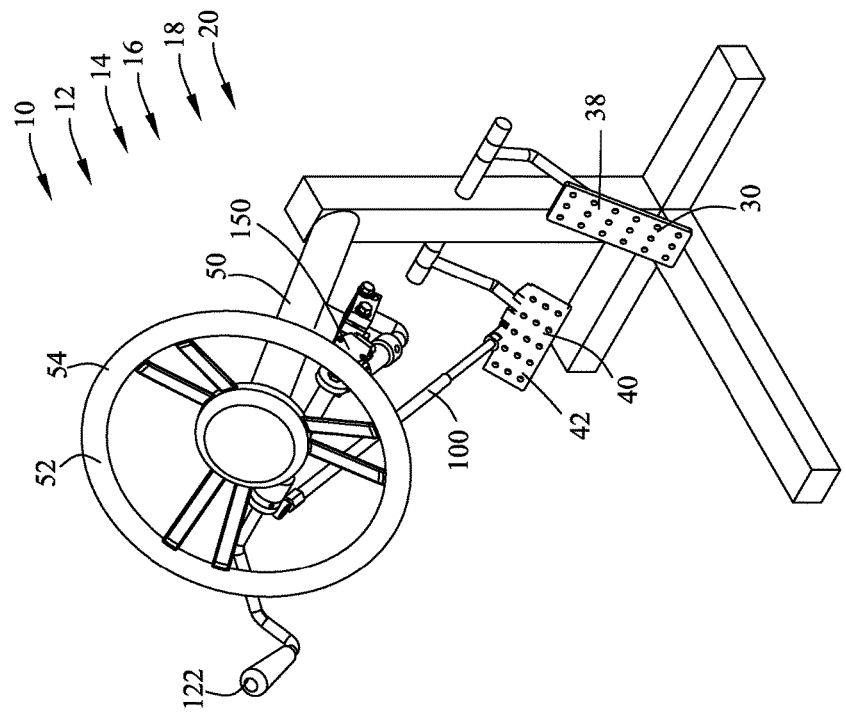
FIG. 1 is an upper left isometric view of an accelerating and braking device for a vehicle incorporating a first embodiment of the present invention.
Figure 2:
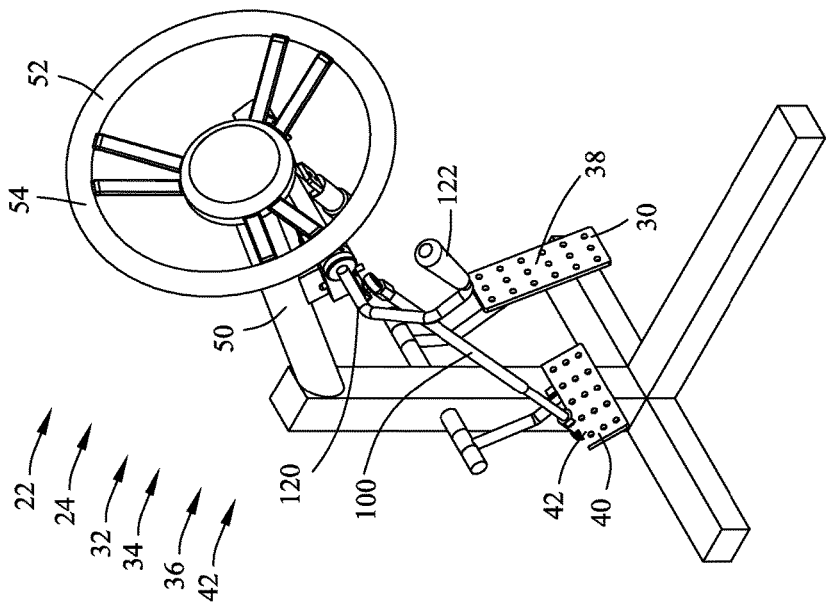
FIG. 2 is an upper right isometric view of FIG. 1.
Figure 8:
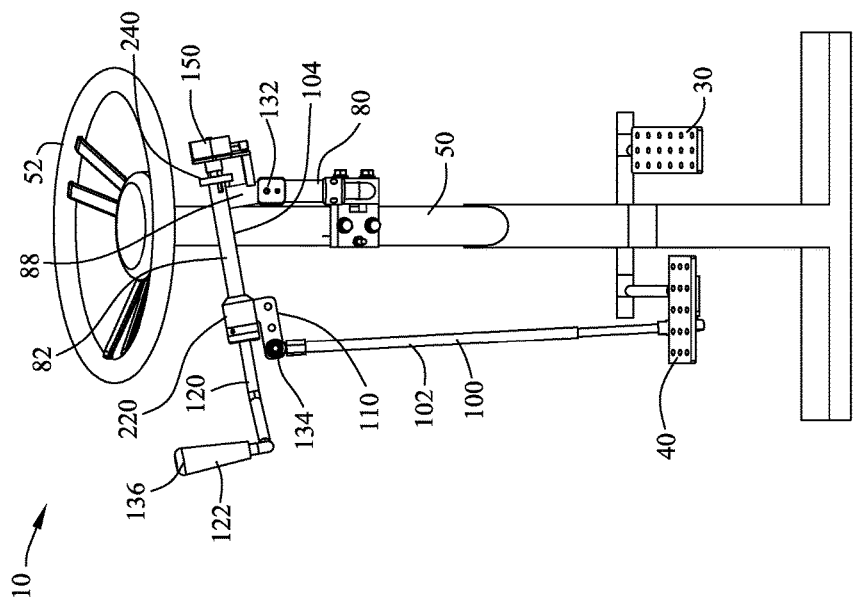
FIG. 8 is an enlarged view of FIG. 3.
Figure 9:
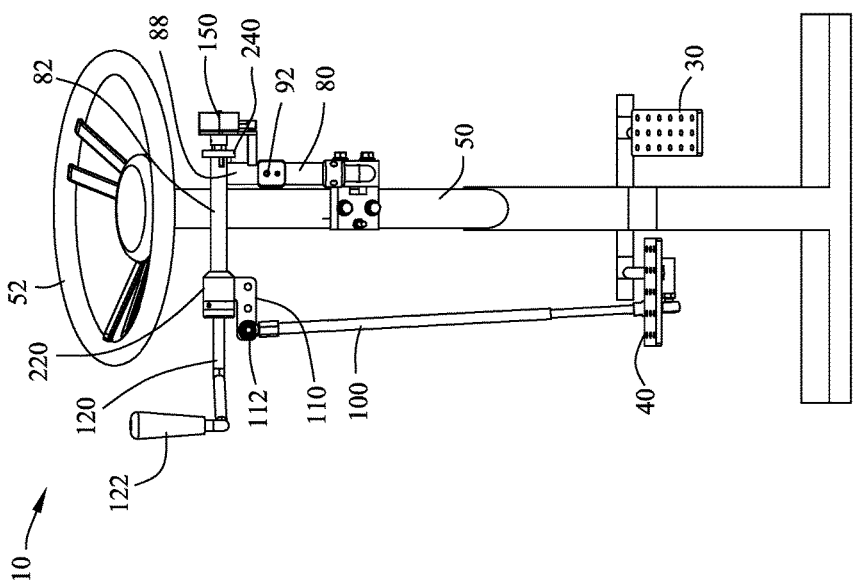
FIG. 9 is a view similar to FIG. 8 illustrating the control arm being displaced in a descending direction for applying the brakes.
Figure 10:
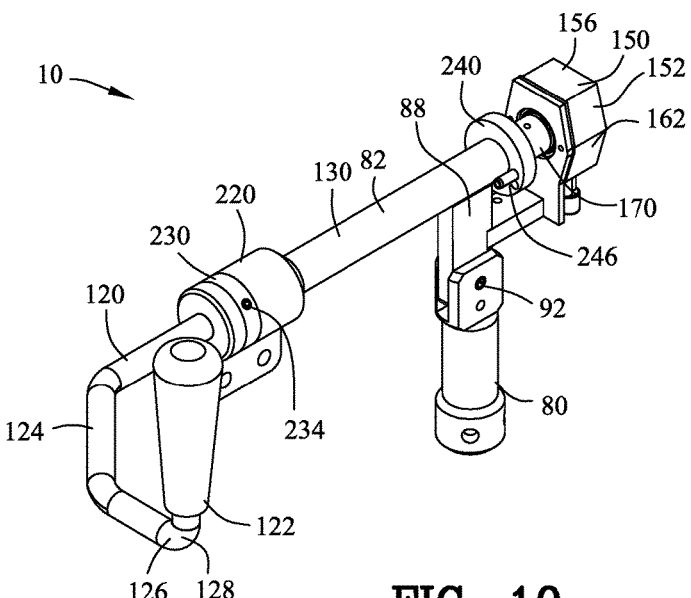
FIG. 10 is an enlarged view of FIG. 1 illustrating a control arm and the control tube incorporating a portion of the accelerating and braking device.
Figure 11:
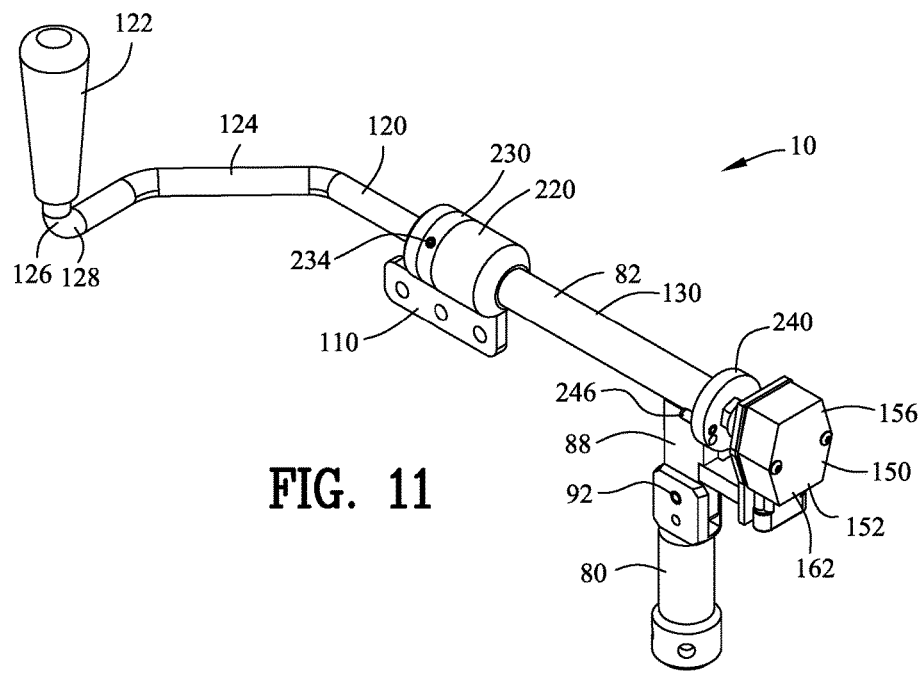
FIG. 11 is an enlarged view of FIG. 2 illustrating the control arm and the control tube.
Figure 17:
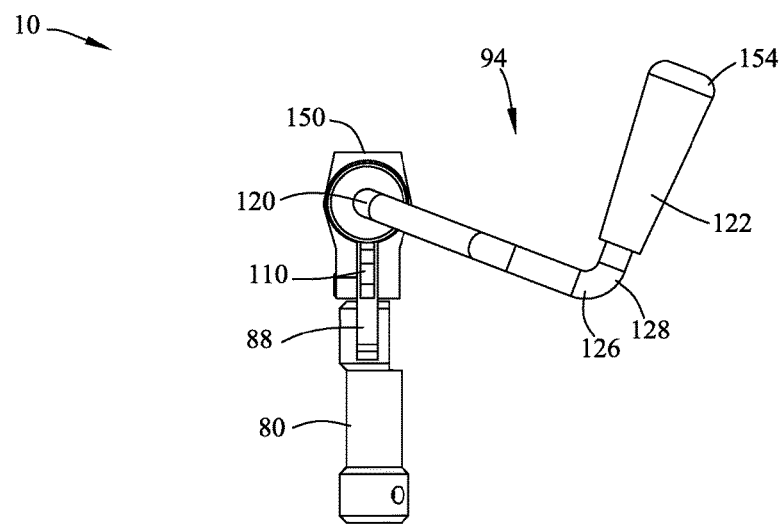
FIG. 17 is left side view of FIG. 10 illustrating the control arm being rotated relative to the control tube for accelerating the vehicle.
Figure 18:
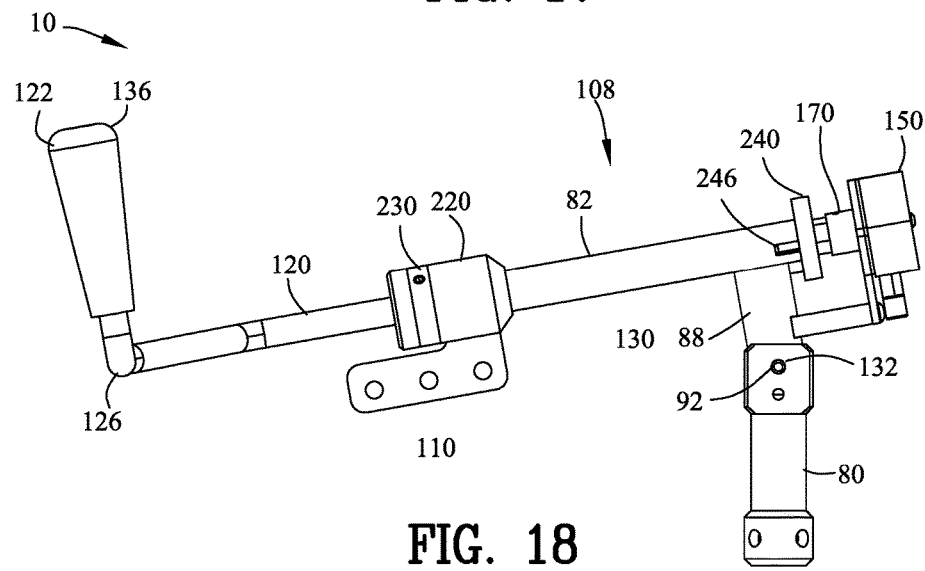
FIG. 18 is a view similar to FIG. 13 illustrating the control tube being pivoted relative to a support tube for braking the vehicle.
Figure 20:
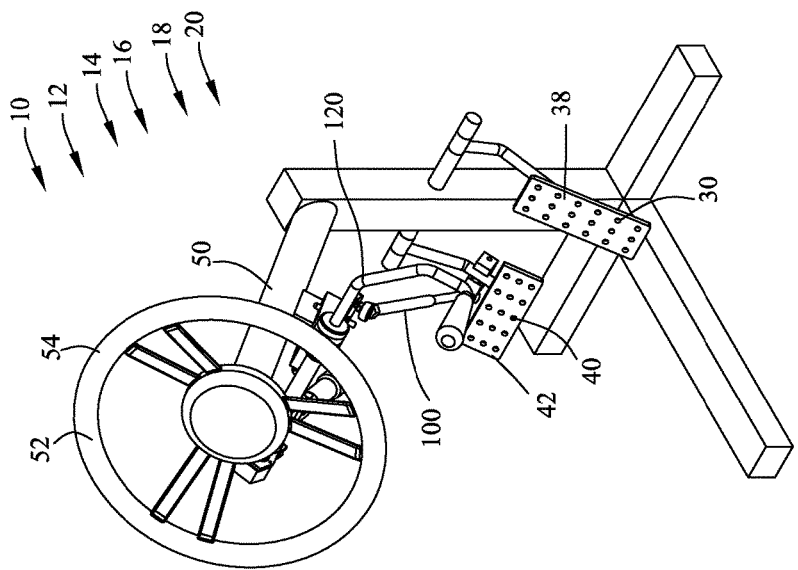
FIG. 20 is an upper right isometric view of FIG. 19.
Figure 19:
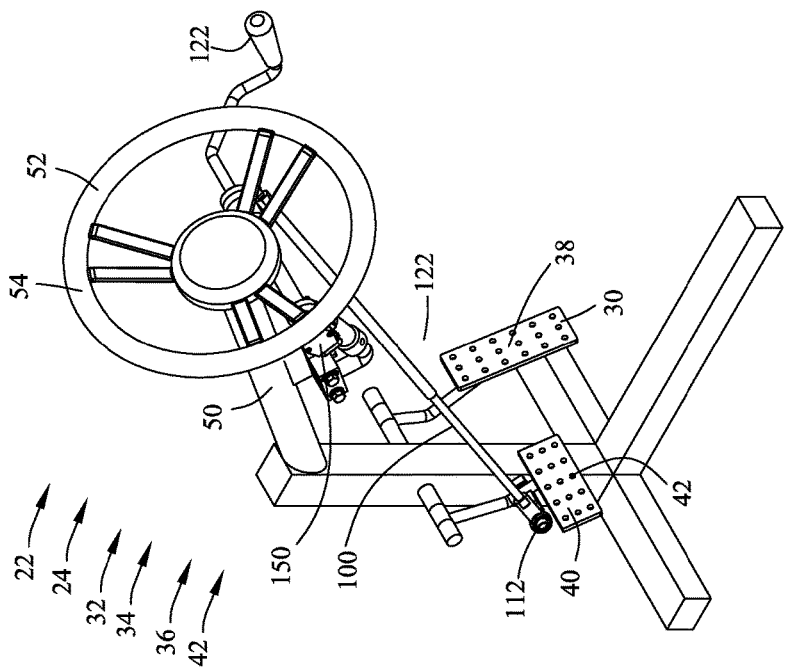
FIG. 19 is an upper left isometric view of an accelerating and braking device for a vehicle incorporating a second embodiment of the present invention.
Figure 23:
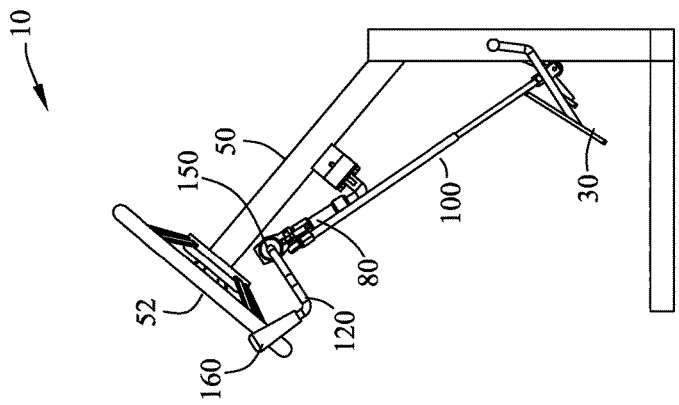
FIG. 23 is a right side view of FIG. 21.
Figure 21:
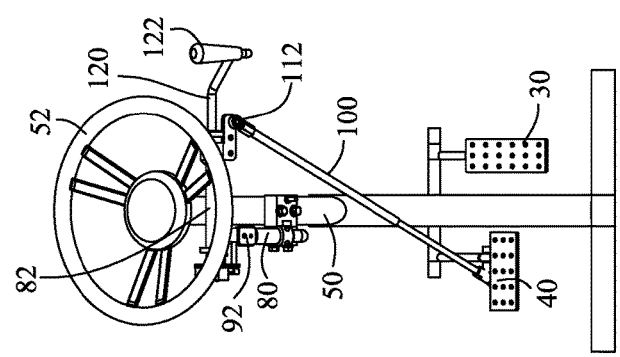
FIG. 21 is a front view of FIG. 19 illustrating the accelerating and braking device at an idle condition and non braking condition.
Figure 22:
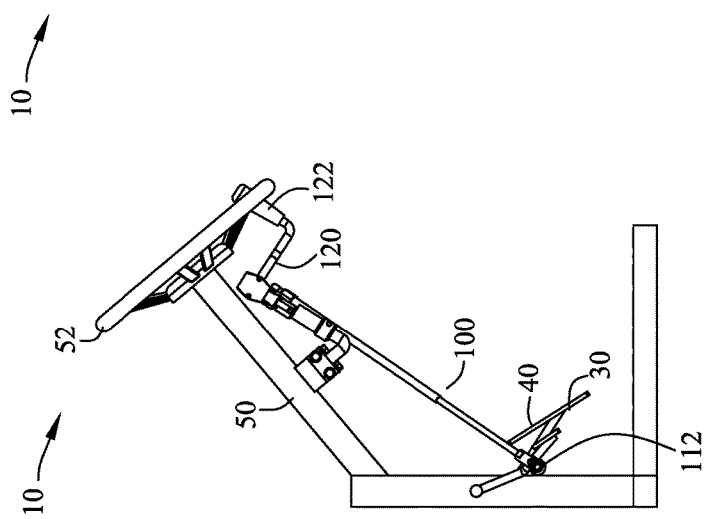
FIG. 22 is a left side view of FIG. 21.
Figure 28:
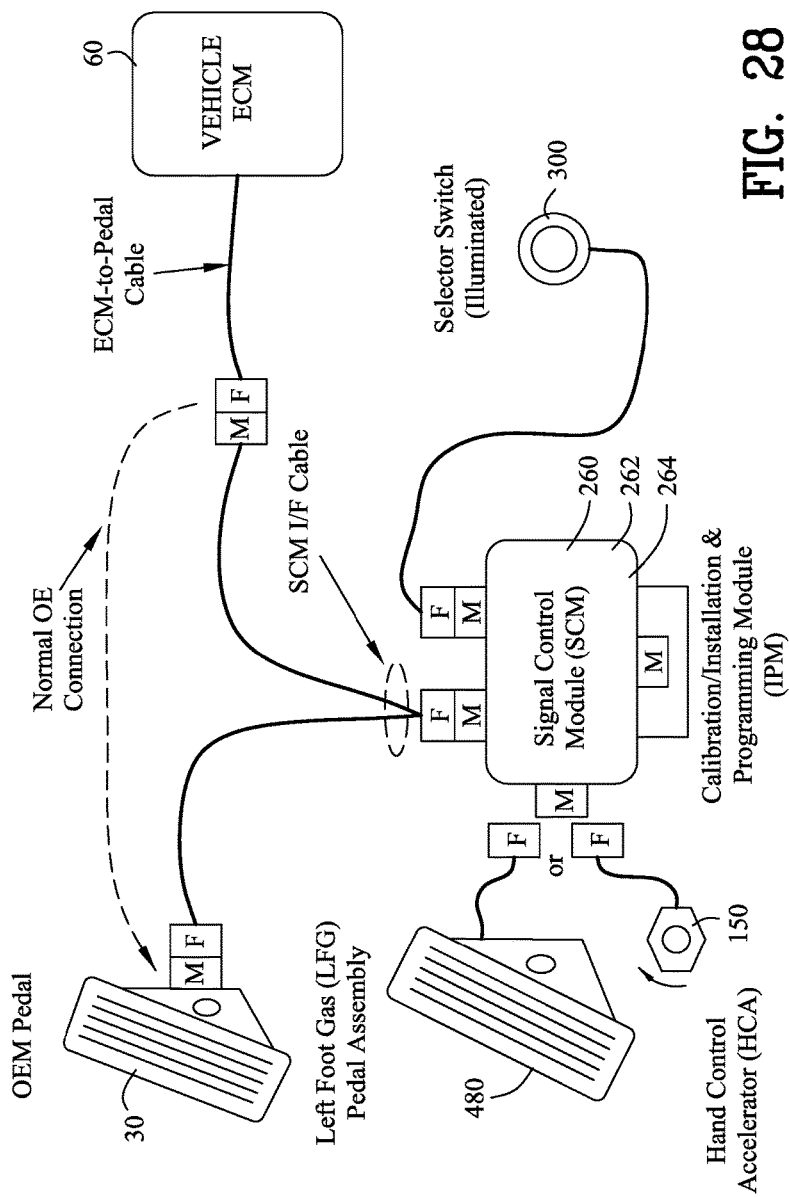
FIG. 28 is a first overview of the accelerating and braking device.

FIGS. 1-50 illustrate an accelerating and braking device 10 for a vehicle 12. The vehicle 12 may include but is not limited to an automobile 14, a truck 16, a golf cart 18, a motorcycle 20, an all-terrain vehicle 22, a vessel 24 or other motorized carriers over a surface.

The vehicle 12 has an accelerator pedal 30 electrically engaging a power system 32 for increasing the velocity/increasing the throttle of the vehicle 12. The power system 32 may include but not limited to an engine 34, a motor 36 or other power generating systems. Alternatively, the accelerator pedal 30 may include an accelerator handle 38 or other accelerator structures.

A brake pedal 40 engages a braking system 42 for decreasing the velocity/decreasing the throttle of the vehicle 12. Alternatively, the brake pedal 40 may include a brake handle 44 or other braking structures.

A steering column 50 supports a steering wheel 52 for altering the direction of the vehicle 12. Alternatively, the steering wheel 52 may include a steering handle 44 or other steering structures. An electronic control module 60 is electrically coupled to the accelerator pedal 30 with the power system 32.

The accelerating and braking device 10 may include a support tube 80 coupled adjacent to the steering column 50. A control tube 82 extends between a proximal end 84 and a distal end 86. A pivot stem 88 is coupled to the control tube 82 and is pivotably coupled to the support tube 80. A control tube bore 90 extends between the proximal end 84 and the distal end 86 of the control tube 82. A control tube pivot 92 pivotably couples the support tube 80 with the control tube 82 for defining an angular displacement 94 of the control tube 82 relative to the support tube 80.

A brake tube 100 links the control tube 82 with the brake pedal 40. A descending displacement 102 of the control tube 82 defines a decreasing angular displacement 104 of the control tube 82 relative to the support tube 80 causing an activation of the brake pedal 40. An ascending displacement 106 of the control tube 82 defines an increasing angular displacement 108 of the control tube 82 relative to the support tube 80 causing a deactivation of the brake pedal 40.

A brake adjustment bracket 110 may be coupled to the control tube 82 for adjusting the coupling position of the brake tube 100 to the control tube 82. The brake tube 100 may include eye joints 112 for coupling the brake tube 100 with both the control tube 82 and the brake pedal 40 and permitting pivoting of the brake tube 100 relative to the control tube 82 and the brake pedal 40 during the descending displacement 102 and the ascending displacement 106.

A control arm 120 is rotatably displaced within the control tube bore 90. A control arm handle 122 is coupled to the control arm 120 for rotatably displacing the control arm 120 relative to the control tube 82. Preferably, the control arm handle 122 includes primary arcuate arm portion 124 and a secondary arcuate arm portion 126. The primary arcuate arm portion 124 laterally distances the control arm handle 122 from the control tube 82. The secondary arcuate arm portion 126 positions the control arm handle 122 in a generally 90° orientation 128 relative to the control arm 120. The primary arcuate arm portion 124 and the secondary arcuate arm portion 126 assists an individual in rotating the control arm 120. Furthermore, the distance between the control arm handle 122, relative to the control tube pivot 92 and the brake tube 100 coupling location with the control tube 82 defines a lever 130 providing a mechanical advantage for the descending displacement 102 and depressing the brake pedal 40. More specifically, the control tube pivot 92 defines a fulcrum 132, the brake tube 100 defines a load 134 and the control arm handle 122 defines an effort 136.

The control arm handle 122 is illustrated as having a generally perpendicular orientation to the steering wheel 52 in the neutral position. Alternatively, the control arm 120 and the control arm handle 122 may be rotated relative to the control tube 82 such that the neutral position of the control arm handle 122 defines a generally parallel orientation relative to the steering wheel 52. Furthermore, the control arm 120 and the control arm handle 122 may be further rotatably adjustable relative to the control tube 82 for providing multiple orientations of the control arm handle 122 relative to the steering wheel 52.

A position sensor 150 is coupled to the control tube 82. The control arm 120 engages the position sensor 150 for producing a variable signal output 152 from the position sensor 150 during rotation of the control arm 120 relative to the control tube 82. The position sensor 150 is electrically coupled to the electronic control module 60. A Tab collar actuator 170 may be utilized for coupling the position sensor 150 with the control tube 82. The tab collar sensor 170 is preferably constructed of plastic. It is designed to shear in the event of an accident. The shearing action permits the internal sensor spring to return the sensor to idle.

A first rotational displacement 154 of the position sensor 150 defines a first variable signal output 156 to the electronic control module 60 for causing an increase in velocity/ increase in throttle of the vehicle 12. A second rotational displacement 160 of the position sensor 150 defines a second variable signal output 162 of the position sensor 150 causing a decrease in velocity/decrease in throttle of the vehicle 12.

A first spring 200 engages the control tube 82 and the control arm 120 for rotatably displacing the control arm 120 relative to the control tube 82 and causing the second rotational displacement 160 and the decrease in velocity/ decrease in throttle of the vehicle 12. A second spring 210 engages the control tube 82 and the control arm 120 for rotatably displacing the control arm 120 relative to the control tube 82 and causing the second rotational displacement 160 and the decrease in velocity/decrease in throttle of the vehicle 12.

The accelerating and braking device 10 includes the first spring 200 and the second spring 210 for a return-to-idle providing safety and redundancy. If one spring fails, the other can still return the hand control to its idle position. This prevents unintentional acceleration (UA) conditions. Return-to-idle must not take more than 1.0 seconds at any temperatures above −18° C. to 52° C. Return-to-idle operation must happen within 3.0 s from −18° C. to −40° C.

A spring cover sleeve 220 may be coupled to the control tube 82. A spring cover sleeve bore 222 extends into the spring cover sleeve 220. The first spring 200 may include a first cylindrical coil spring 202 having a first diameter 204 for applying a first torsional force. The second spring 210 may include a second cylindrical coil spring 212 having a second diameter 214 for applying a second torsional force. Preferably the first diameter 204 is less than the second diameter 214 for positioning the first spring 200 within the second spring 210 and defining a concentric spring system 224. The concentric spring system 224 encircles the control arm 120 and is positioned within the spring cover sleeve bore 222. A tension spring isolation cylindrical sleeve 226 may be positioned between the first spring 200 and the second spring 210.

The first cylindrical coil spring 202 and the second cylindrical coil spring 212 received a torsional force from the pivoting of the control arm 120 from the idle position. Upon the user releasing the throttle, the first cylindrical coil spring 202 and the second cylindrical coil spring 212 produce a first torsional force and a second torsional force respectively on the control arm 124 for returning the control arm 120 and the position sensor 152 to the idle position.

Alternatively, the first spring 200 may include a first compressive coil spring engaging between the support tube 80 or the pivot stem 88 and the range collar 240 for applying a first expansion force. Similarly, the second spring 210 may include a second compressive coil spring engaging between the support tube 80 or the pivot stem 88 and the range collar 240 for applying a second expansion force. More specifically, the first compressive coil spring and the second compressive coil spring are compressed upon a user engaging the throttle from the idle position. Upon the user releasing the throttle, the first compressive coil spring and the second compressive coil spring produce a first expansion force and a second expansion force respectively for returning the control arm 120 and the position sensor 152 to the idle position. Other sources of return energy they be utilized for returning the control arm 120 and the position sensor 152 from and non-idle position to the idle position. More specifically, the sources of return energy may include hydraulic, belts, prestressed members, energy retaining arcs or other structures.

A tension adjustment collar 230 has a tension collar bore 232 for receiving the control arm 120 and being rotatably displaced relative to the control tube 82. The concentric spring system 224 is coupled between the spring cover sleeve 220 and the tension adjustment collar 230. The tension adjustment collar 230 may be rotated to pretension the concentric spring system 224. Thereafter, tension collar setscrew 234 may threadably engage the tension adjustment collar 230 and compresses against the control arm 120 for securing the tension adjustment collar 230 to the control arm 120. The concentric spring system 224 rotatably displaces the control arm 120 relative to the control tube 82 and causes the second rotational displacement 160 and the decrease in velocity/decrease in throttle of the vehicle 12.

A range collar 240 has a range collar bore 242 for receiving the control arm 120 and rotatably displaced relative to the control tube 82. The range collar 240 includes a plurality of range collar apertures 244. A first range selector 246 which may include a first pin engages the range collar 240 and contacts the pivot stem 88 for terminating the rotational displacement of the control arm 120 relative to the control tube 82 for the first rotational displacement 154. A second range selector 248 which may include a second pin engages the range collar 240 and contacts the pivot stem 88 for terminating the rotational displacement of the control arm 120 relative to the control tube 82 for the second rotational displacement 160. Range of movement is approximately 30 to 45 degrees, but can vary depending on the model of the hand control.

A signal control module 260 is electrically coupled between the position sensor 150 and the electronic control module 60 of the vehicle 12. The signal control module 260 electrically calibrates the first variable signal output 156 of the first rotational displacement 154 and the second variable signal output 162 of the second rotational displacement 160. The signal control module 260 may include manual solid-state electrical components 262 for calibrating the first variable signal output 156 of the first rotational displacement 154 and the second variable signal output 162 of the second rotational displacement 160. The signal control module 260 may alternatively include a microprocessor 264 for calibrating the first variable signal output 156 of the first rotational displacement 154 and the second variable signal output 162 of the second rotational displacement 160.

Acceleration Pedal Position Sensors (APPS) are always paired for redundancy. The vehicle's electronic control module (ECM) compares one signal with the other to see if the signals are valid. If the signals do not compare properly then the ECM registers a diagnostic test code (DTC) and alerts the driver that there is a problem. This is when the "Check Engine Light" illuminates. The vehicle is forced into "limp" mode-a fast idle condition allowing the driver to limp to a service station. No acceleration pedal input is accepted in this state.

APPS systems are predominantly two track. Three track systems are rare. The ECM compares the value of signal #1 with signal #2 to determine if the APPS is valid. The H accelerating and braking device 10 can work with 3 track systems but this will require 2 SCM's and some extra wire over the normal 2 track systems.

Signal #1 and Signal #2 can both be defined by the linear function:

$V = m*\theta + Voffset$, where "V" is DC volts, "m" is the slope of the curve ($m = \Delta V/\Delta \theta$), and $\theta$ is the angle of depression of the hand control lever (or LFG lever). For the best possible redundancy, the slope (m) and the offset (Voffset) of Signal #1 and Signal #2 are not allowed to be the same. The curves never intersect. These signals are not standardized across vehicle makes and models.

Figure 29:
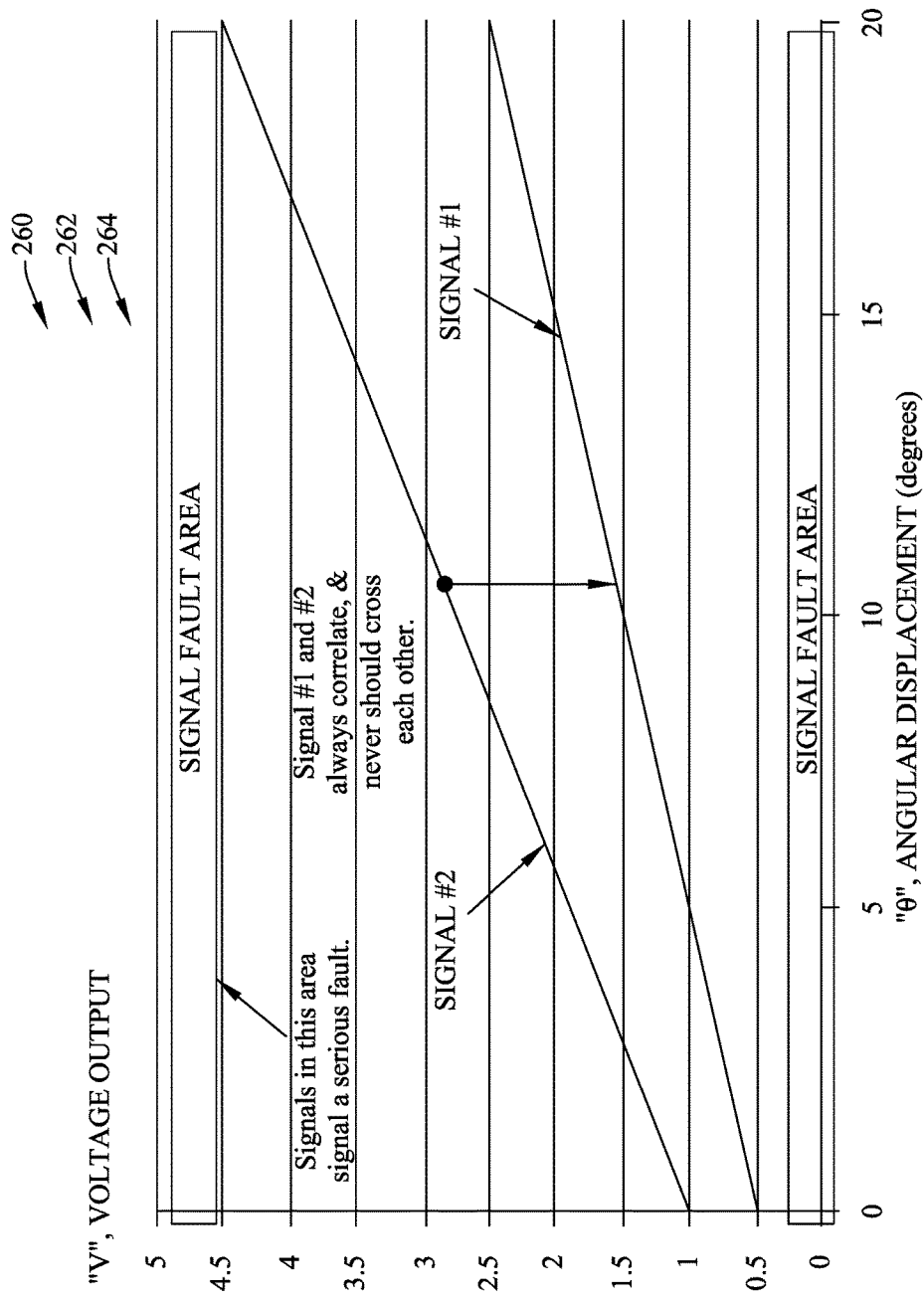
FIG. 29 is a line graph illustrating a typical accelerator pedal position sensor signal output to the atomic control module.
Figure 30:
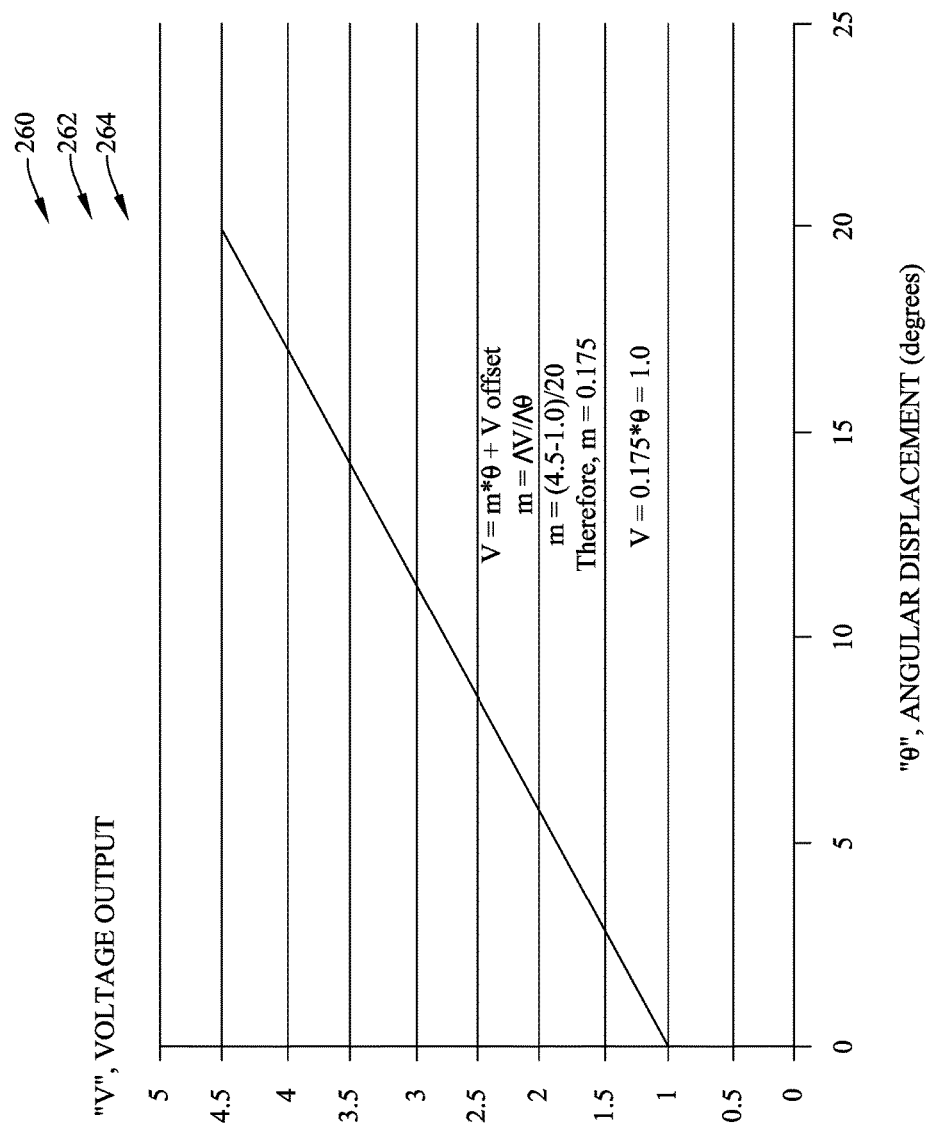
FIG. 30 is a line graph illustrating the signal control module analyzing signal number two output (upper signal) from the vehicle electronic control module of FIG. 29.
Figure 31:
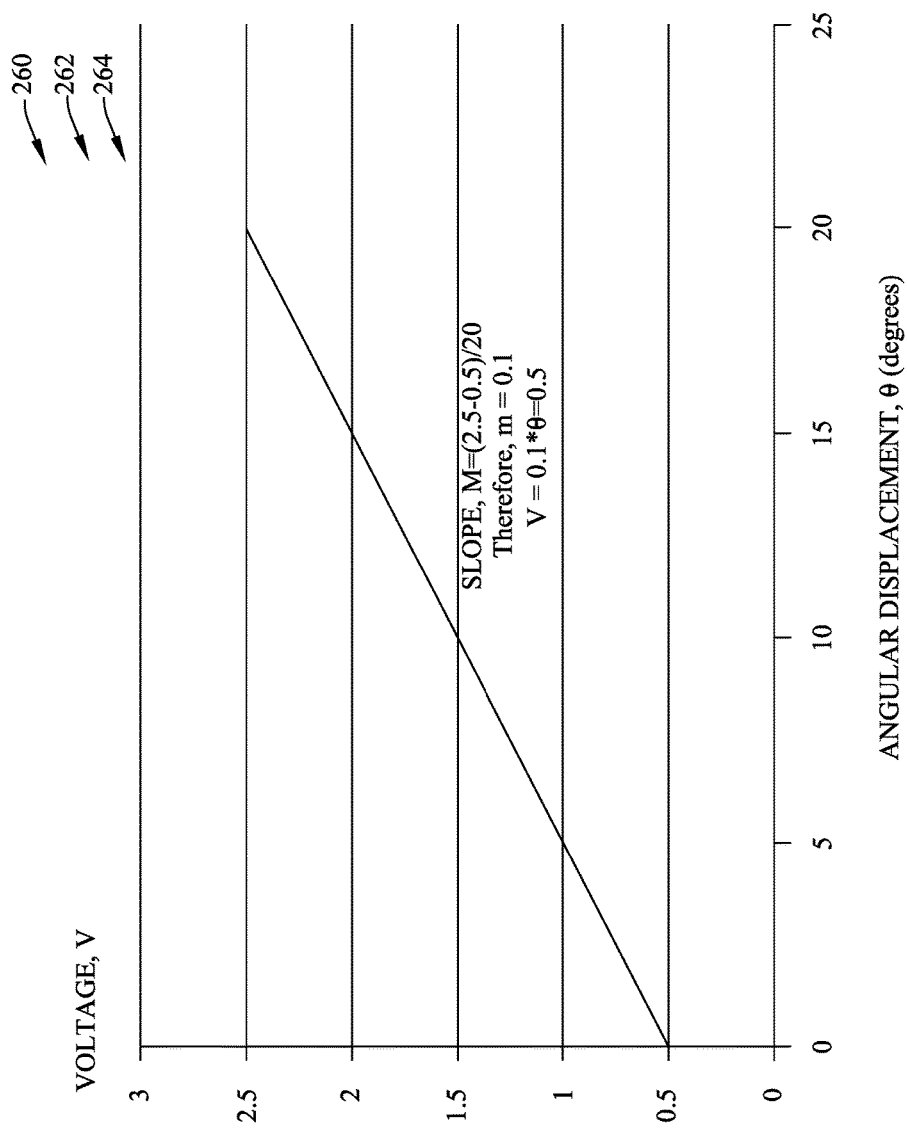
FIG. 31 is a line graph illustrating the signal control module analyzing signal number one (lower signal) from the vehicle electronic control module of FIG. 29.

FIG. 29 illustrates a typical to track accelerator pedal position sensor (APPS) signal output to ECM. FIG. 30 illustrates analyzing signal number two output (upper signal) of FIG. 29. FIG. 31 illustrates analyzing signal number one (lower signal) of FIG. 29. FIGS. 32 and 33 illustrate signal translation that is steps required to translate "HCA-S1" to "ECM-S1". As illustrated the offset of HCS-S1 is 0.5V however the ECM expects ECM-S1 to be 1.0V. The top limit for HCA-S1 is 2.5V however the ECM needs a top limit of 2.75V.

FIG. 34 illustrates the first step in calibrating the accelerating and braking device 10 includes difference-out the hand control (or left foot gas) signal offset. This is handled by the noninverting difference operational amplifier stage. This is referred to as offset-null adjustment. The conditions for the accelerating and braking device 10 currently include the ignition on, the engine not running and the HCA and OEM pedal are both at idle (WOT=0%/o). More specifically the first step shifts the curve down so that the beginning value is 0.0V. as shown in the slope of the HCA-S1 remains constant.

FIG. 35 illustrates the second step in calibrating the accelerating and braking device 10 including setting the OEM offset adjust POT so that the summed value of HCA-S1 (IDLE=0.0V) plus the value of OEM S1 offset (from the POT) matches the signal level that the ECM is expecting at IDLE (i.e. ECM-S). The conditions for the accelerating and braking device 10 currently include the ignition on, the engine not running and the HCA and OEM pedal are both at idle (WOT=0%). This step includes adjusting the OEM-IDL-OFS POT to match the voltage of the OEM pedal signal at IDLE. This is what the ECM requires. HCA-S1-OUT will go from 0.0V to 1.0V.

FIG. 36 illustrates the third step in calibrating the accelerating and braking device 10 including adjusting the span of HCA-S1 so the STM output equals the OEM pedal signal (OEM-S1) at WOT=100%. This completes the calibration process for Signal #1. Now, Step 1, 2, and 3 needs to be done for Signal 2. The conditions for the accelerating and braking device 10 currently include the ignition on, the engine not running and the HCA and OEM pedal are both at WOT=100%). This step includes adjusting the inverting gain adjust POT (SPAN POT) so that HCA-S1-OUT equals the output of the OEM pedal (OEM-S1) at 100% WOT.HCA-S1-OUT will go from 0.0V to 1.0V. Before adjusting the span POT the output will be 3.0V. This is the top most value of the curve after STEP 1.

The signal control module 260 is advantageous in that the (SCM) generates the ECM-S1 and ECM-S2 signal by using the signals HCA-S1 and HCA-S2 (or LFG-S1 and LFG-S2). The Signal Translation Modules (STMs) inside the SCM do this function. STM #1 translates HCA-S1 to ECM-S1. STM #2 translates HCA-S2 to ECM-S2. STMs preserve the natural OEM signal redundancy because they operate autonomously. This allows the ECM to be able to distinguish fault conditions so it can prevent unsafe operation, or unintentional accelerations. There are three sources of failure in automotive systems: (1) mechanical failures, (2) electrical failures, (3) firmware related failures. The accelerating and braking device 10 eliminates firmware related failures because there is no microcontroller. The possibility of having electrical failures has also been reduced due to the simplicity of the design. The SCM can be trimmed electronically using a microprocessor based Installers Programming Module (IPM). The IPM can automatically trim the non-volatile, I2C digital potentiometers. Once the calibration is completed, however, the IPM is disconnected.

Figure 37:
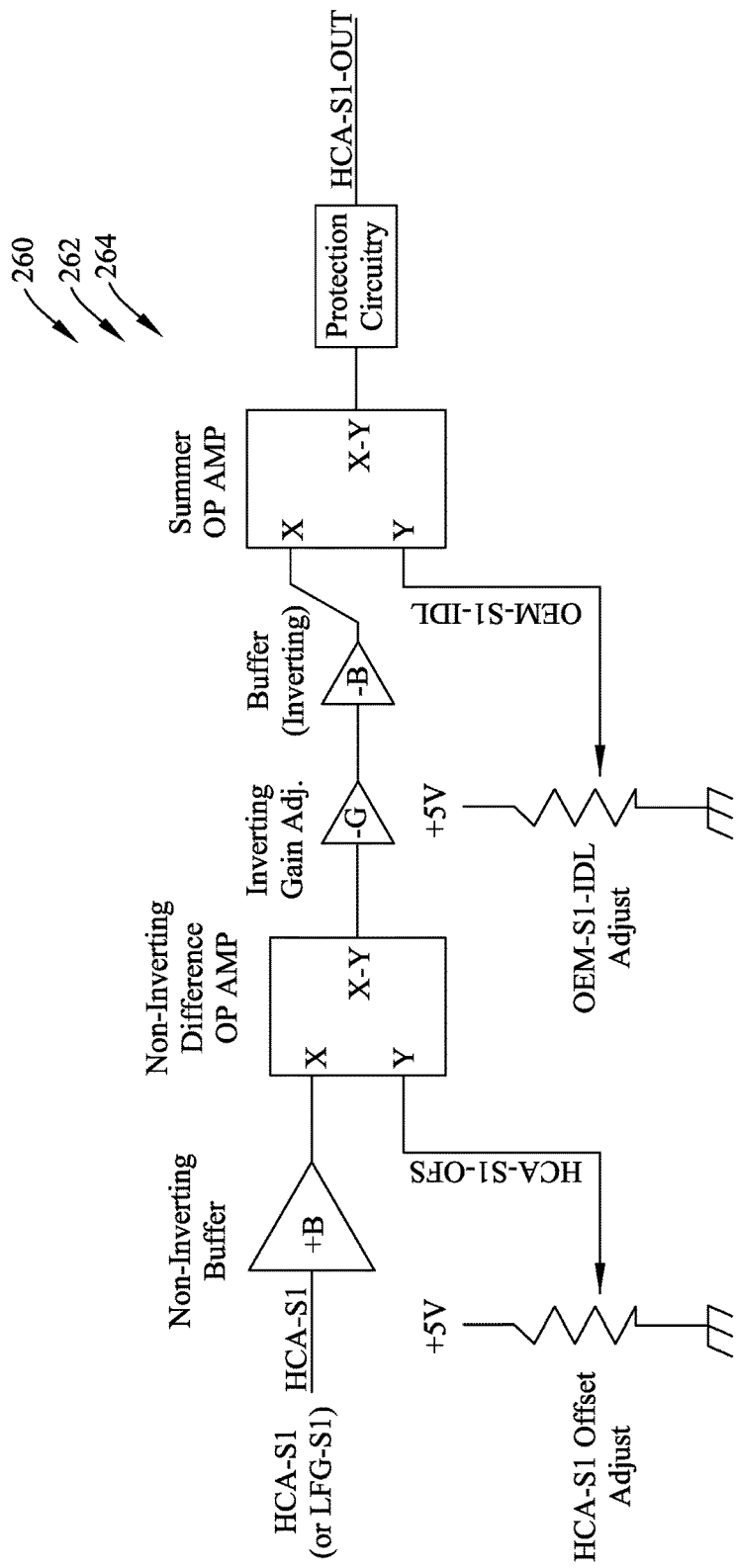
FIG. 37 is a diagram for the signal translation module (STM) for OEM signal #1.

FIG. 37 illustrates a functional block diagram for the signal translation module (STM). FIG. 37 includes the STM for OEM signal #1. The SCM is comprised of two STMs. One translates the hand control (or LFGP) HCA-S1 signal to obtain ECM-S1, the other translates HCA-S2 to ECM-S2.

Figure 38:
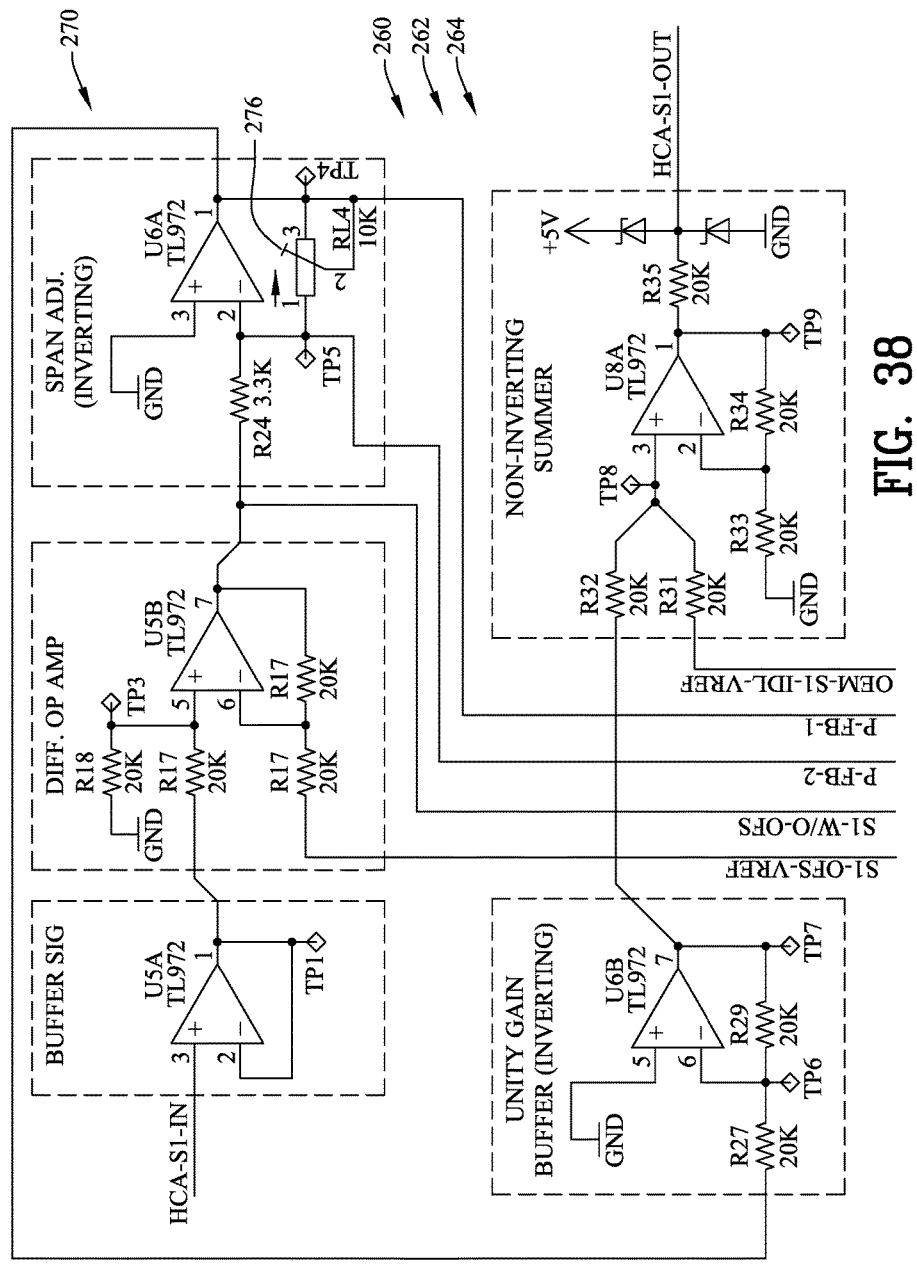
FIG. 38 is a first portion of a STM circuit schematic.
Figure 39:
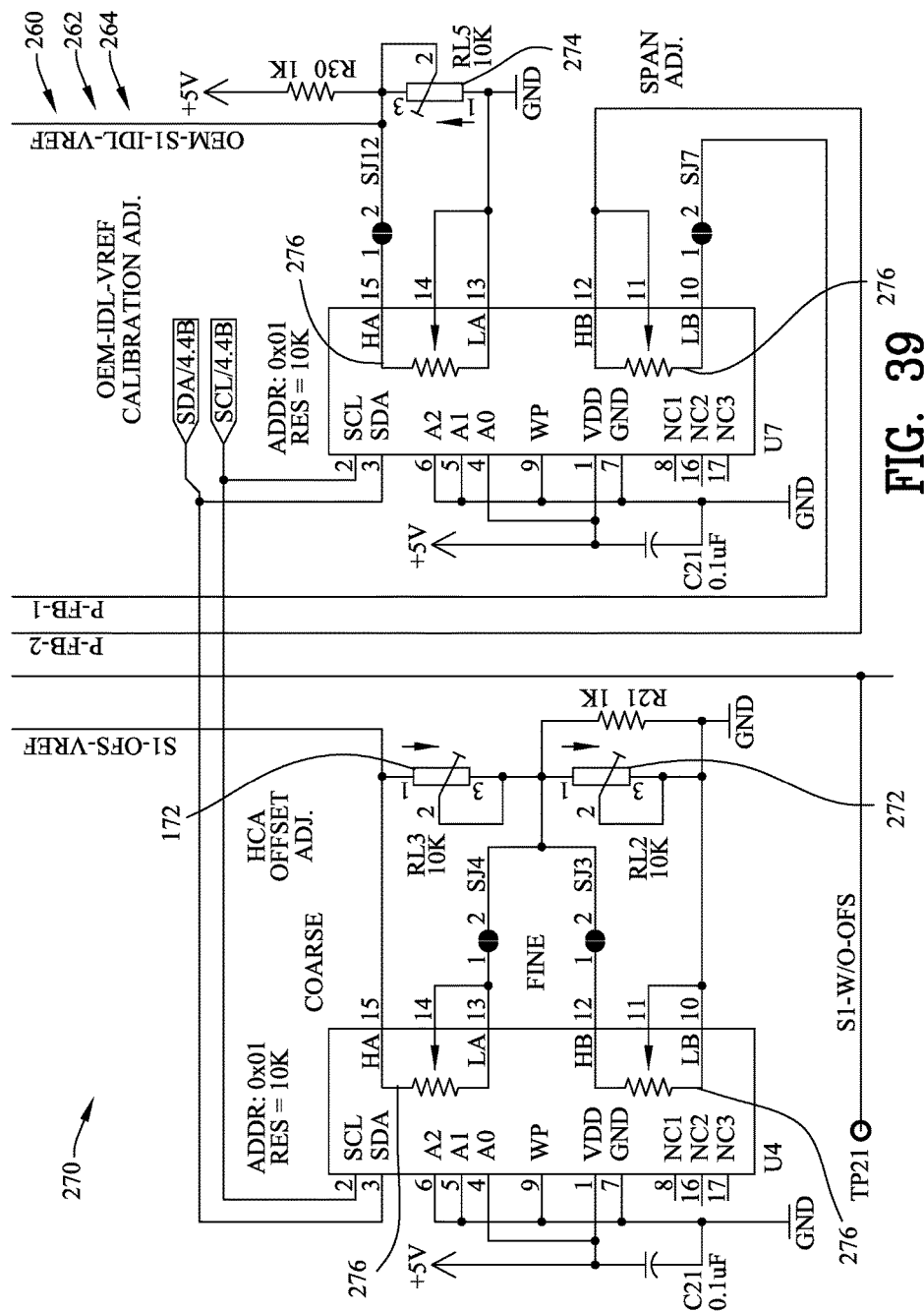
FIG. 39 is a second portion of the STM circuit schematic.

FIGS. 38 and 39 illustrate the STM Circuit Schematic 270. FIG. 39 shows POTs to adjust HCA-S1 offset null voltage 272. FIG. 39 illustrates POT to adjust OEM-S1 offset voltage 274. FIG. 38 shows POT to adjust the Inverting Gain Adjust POT (SPAN POT) so that HCA-S1-OUT equals the output of the OEM pedal (OEM-S1) at 100% WOT.

Figure 40:
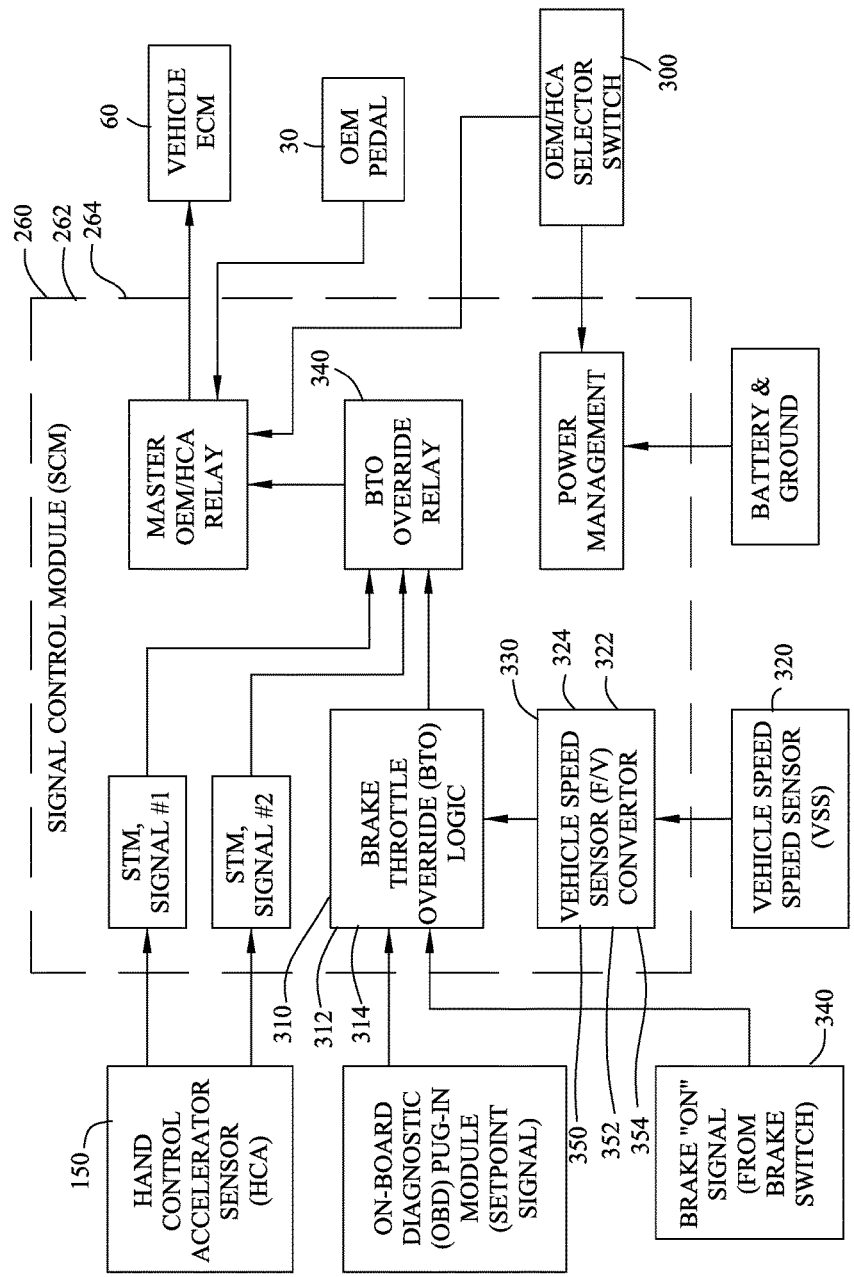
FIG. 40 is a block diagram of the system overview.

As shown in FIG. 39, I$^2$C programmable POTs 276 (4 shown) required for the automatic calibration feature. For automatic calibration to work, the manual POTs must not be populated, and the appropriate solder jumpers must be shorted (SJ3, SJ4, SJ2, and SJ7). FIG. 40 illustrates a system overview.

A selector switch 300 is electrically coupled to the signal control module 260. The selector switch 300 alternatively electrically couples the accelerator pedal 30 or the position sensor 150 for increasing the velocity/increasing the throttle of the vehicle 12.

A brake switch 310 is electrically coupled to the signal control module 260. The brake switch 310 defines a non-activation condition 312 during the brake pedal 40 being not engaged. The brake switch 310 defines an activation condition 314 during the brake pedal 40 being engaged. The activation condition 314 causes the signal control module 260 to produce the second variable signal output 162 of the position sensor 150 regardless of the first variable signal output 156. The activation condition 314 decreases the velocity of the vehicle 12.

A second embodiment of the brake switch 310 defines a first non-activation condition 312 during the brake pedal 40 being not engaged. The brake switch 310 defines a first activation 314 condition during the brake pedal 40 being engaged. A vehicle speed sensor 320 is electrically coupled to the signal control module 260. The vehicle speed sensor 320 defines a second non-activation condition 322 during the vehicle 12 having a velocity below a stored value 330. The stored value 330 may include 10 mph. The vehicle speed sensor 320 defines a second activation condition 324 during the vehicle 12 having a velocity above a stored value 330. The first activation condition 314 and the second activation condition 324 causing the signal control module 260 to produce the second variable signal output 162 of the position sensor 150 regardless of the first variable signal output 156. The first activation condition 314 and the second activation condition 324 decreasing the velocity/decreasing the throttle of the vehicle 12. The first activation condition 314 and the second non-activation condition 322 not decreasing the velocity/decreasing the throttle of the vehicle 12.

A third embodiment of the brake switch 310 defines a first non-activation condition 312 during the brake pedal 40 being not engaged. The brake switch 310 defines a first activation condition 314 during the brake pedal 40 being engaged. The first activation condition 314 causes the signal control module 260 to produce the second variable signal output 162 of the position sensor 150 regardless of the first variable signal output 156. The first activation condition 314 decreasing the velocity/decreasing the throttle of the vehicle 12. A brake throttle override switch 340 is electrically coupled to the signal control module.

The brake throttle override switch 340 defines a second non-activation condition 322 during the brake throttle override switch 340 being not engaged. The brake throttle override switch 340 defines a second activation condition 324 during the brake throttle override switch 340 being engaged. The second activation condition 324 causes the signal control module 260 to negate the first activation condition 314 for permitting both the application of the braking system 42 and the power system 32 for a period of time.

The brake throttle override (BTO) prevents unintentional accelerations (UAs) by allowing the acceleration to be cancelled by the driver applying the brake. NHTSA highly recommends BTO to prevent UA accidents. Pressing the brake forces ECM-S1 and ECM-S2 to return to idle. More specifically, with the brake throttle feature BTO enabled, depressing the brake will cause the signal control module (SCM) to revert to the idle condition and thus the idle reference voltage from signals one and two are presented to the vehicles electronic control module inputs.

Options for Enabling BTO Operation:

Brake only—pressing the brake will return the acceleration signals to idle. For this, the "BRAKE ON" signal from the brake switch must be connected to the SCM.

Brake and speed sensing—the brake must be pressed and the vehicle must be going 10 MPH (16 KPH) or faster. This is good for starting on hills, or for hauling a trailer. In addition to the "BRAKE ON" signal, the Vehicle Speed Sensor (VSS) must be connected. Alternatively, a gating signal from an On-Board Diagnostic port is possible. This is like the small modules that insurance companies use to evaluate your driving habits.

Brake, Speed and Accelerator Pedal Position—the BTO activates only if the brake is pressed, and if the speed is over 10 MPH, and if the accelerator pedal is greater than 25% WOT. The accelerator pedal signal is generated by the SCM, so no additional wiring is required for this.

Disable the BTO entirely. This is only recommended for vehicles already having BTO capability.

Figure 41:
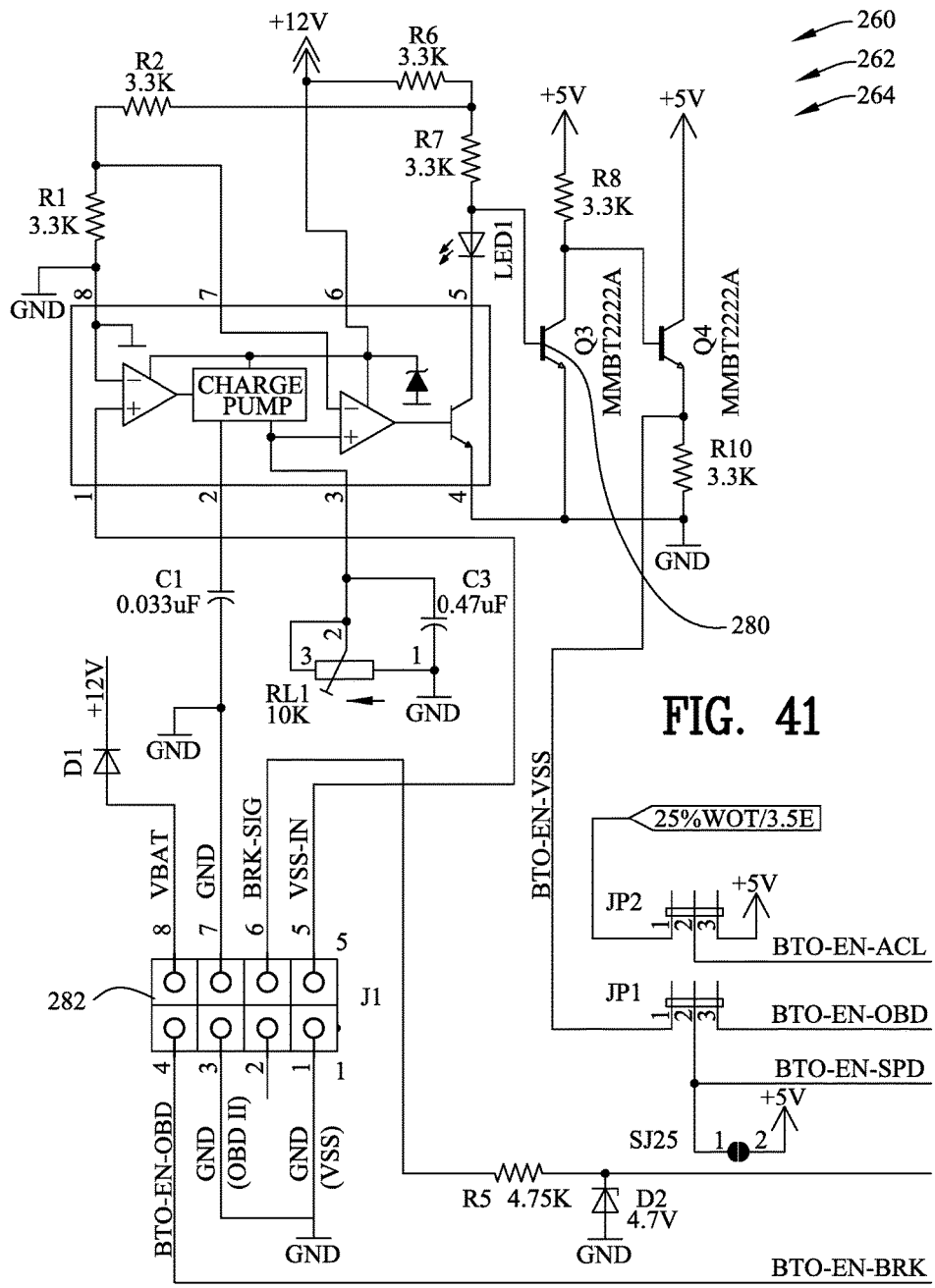
FIG. 41 is first portion of a BTO circuit schematic.
Figure 42:
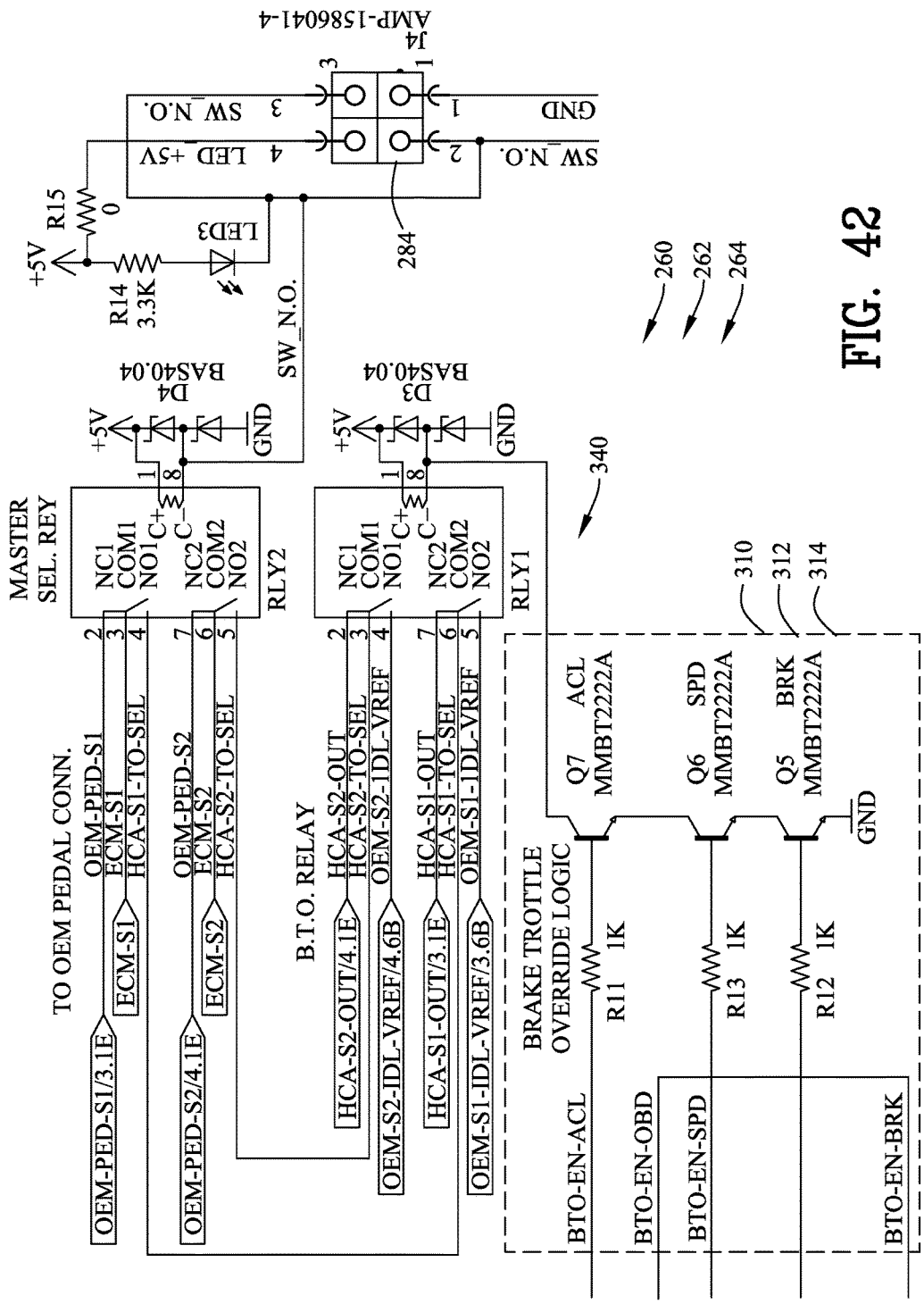
FIG. 42 is a second portion of a BTO circuit schematic.

FIGS. 41 and 42 illustrate the BTO implementation in SCM. FIG. 41 illustrates a Frequency-to-voltage convertor uses the signal from the Vehicle Speed Sensor (VSS) 280 and an External connections: VSS, OBD_EN, battery voltage, and ground connections 282. FIG. 42 illustrates the HCA/OEM select switch 284. The disconnecting "Brake Sense" disables BTO functionality.

A secondary embodiment of the BTO may be incorporated that includes a simplified method of implementing BTO capability that is easier to implement, and offers a much lower install cost. Typically there are four considerations re: engaging the BTO: (1) speed, (2) accelerator pedal position; (3) brake pedal position/state, and (4) state sequencing. Accelerator pedal position and brake pedal monitoring are the easiest to determine. For example, Brake on/off can be tapped into right at the brake pedal switch. Tapping into the Vehicle Speed Sensor (VSS) signal circuit quite challenging and expensive because this signal not inside the vehicle cab, so to access it one must drill holes through the firewall. This is not a great solution when maintaining a low, overall cost is important to the success of the product.

A secondary embodiment of the BTO may be activated when the brake is pressed, SCM reverts to 0% Wide Open Throttle (W.O.T.). If the driver presses the momentary "BTO disable" button, then the driver has a predetermined amount of time (i.e. one minute) wherein the driver doesn't have BTO override. Simultaneous application of brake and acceleration signals are possible in this timeframe. This might be useful for towing applications, starting out on steep inclines, etc. After the predetermined time is finished the operation reverts to the normal BTO override function. To disable BTO functionality do not connect the vehicle's Brake_Sense wire to the SCM's brake sense input.

A pedal sensitivity switch 350 is electrically coupled to the signal control module 260. A pedal sensitivity data 352 is in the signal control module 260. The pedal sensitivity switch 350 defines a non-activation condition 312 for providing a non-altered first variable signal output 156 to the electronic control module 60 and causing a non-altered increase in velocity/increase in throttle of the vehicle 12. The pedal sensitivity switch 350 defines an activation condition 314 for activating the pedal sensitivity data 352. The pedal sensitivity data 352 provides an altered first variable signal output 354 to the electronic control module 60 and causing a reduced increase in velocity/increase in throttle of the vehicle 12.

The sensitivity of the pedal can be selected so that drivers can selectively set the amount of sensitivity they desire by means of a selector switch. Experienced drivers are more likely to select full, original range pedal response. The idle position of the of the hand control accelerator (HCA) or the Left Foot Gas (LFG) is always equivalent to the idle of the vehicle's OEM acceleration pedal. The accelerating and braking device 10 allows the 100% WOT position of the HCA or LFG to be set variably with respect to the OEM pedal signal.

Example 1

100% WOT of the HCA/LFG is calibrated to 75% of OEM pedal. The result is that the HCA/LFG sensitivity is reduced by 25%.

Example 2

100% WOT of the HCA/LFG is calibrated to 50% of OEM pedal. The result is that the HCA/LFG sensitivity is reduced by 50%.

Example 3

100% WOT of the HCA/LFG is calibrated to 25% of OEM pedal. The result is that the HCA/LFG sensitivity is reduced by 75%.

The PSO selector switch can have the following features:
Just Highway Mode, and City Mode, or
Adjustable Mode (i.e. a switch with multiple settings or a potentiometer).

Pedal sensitivity settings are stored in the non-volatile memory of the Signal Control Module (SCM) microcontroller. These values are (a) loaded in the programmable digital potentiometers on the SCM, or (b) are used to configure the processing of signals by the microcontroller (or other signal processing means) in the event programmable potentiometers are not used. PSO settings can be accomplished with manual calibration as well. The settings are updated (a) when the vehicle is started, or (b) when the driver selects another setting.

Method for Setting OEM Pedal Percentage WOT:
Hand clamps (configured as spreader clamps) with graduations (index marks) to determine the percentage of Wide Open Throttle (WOT) setting.

Hand clamps (configured as spreader clamps) used to actuate the OEM pedal with the use of a measuring tape and/or engine speed feedback.

An angle sensor with/without a gravity level reference. Most OEM pedals have between 15 and 20 degrees of movement from idle to 100%/o WOT.

Setup Procedure: OE Pedal Side
Unplug the connector at the OE pedal. This is at the end of the "ECM-to-OE Pedal" cable. Now, plug this connector into the mating connector of the SCM I/F Cable.

Plug the other end of the SCM I/F cable into the appropriate SCM connector.

Plug the remaining connector on the end of the SCM I/F Cable into the OE pedal connector.

Now, the vehicle's ECM cable is connected to the SCM. The output signals translated from the HCA (or LFG) will be sent to the vehicle's ECM.

Setup Procedure: ECM Side
Plug the connector at the end of the SCM-to-OE-Pedal wire harness into the OE pedal.

Plug the other end of the SCM-to-OE-Pedal into the SCM connector.

Now, the vehicle's OE pedal signals go directly to the SCM.

Following Setup Procedure:
Plug the connector at the end of the HCA (or LFG) cable into the appropriate SCM connector.

Mount the Selector Switch. Plug the end of the Selector Switch Assembly cable into the appropriate SCM connector.

Make all other miscellaneous electrical connections: battery power, ground, and brake.

The advantages of the left foot gas accelerator include:
there are no linkage or cables required.
Pedal access for non-handicapped drivers is not obstructed by clamping blocks or floor mounted hardware.
There are better options for mounting.
There are no cables to fray, stretch, or break.
Less costly than mechanical assemblies.
Mechanical feel and response of the LFG is just like OE.
Easier to install.
Pedal sensitivity is adjustable.
Brake Throttle Override (BTO) safety feature is standard but can be disabled. This greatly reduces potential liability for mobility dealers.
BTO operation is flexible with three ways to configure it, or it can be disabled completely. "Hill Stop and Start" is possible with BTO enabled.
A pedal guard is not required because the OE pedal is disabled when the LFG is selected. This reduces the overall cost of the system.

Further advantages of the HCA/LFG electronic accelerator include:
Meets SAE J1843 standards.
Meets meet Federal Motor Vehicle Safety Standards (FMVSS 124 tested)
Commercially available, high quality, OEM electronic pedal.
Has convenient mounting options which allows easy installation in all vehicles:

(1) Vertical mount on inside firewall
(2) Floor mount.
(3) Suspended mount (bracket mount) via steering column support bolts.

Costs much less than dealer sourced gas pedal solutions.
Dual channel redundancy built-in.
Compatible with 98% of all vehicles produced after 2010.
Accommodates vehicles with more than 2 track systems.
Sensors have an outstanding track record. They were made for busses and trucks.

The HCA sensor is the same sensor that is used on the LFG.

Quick and easy calibration is possible in minutes.

Figure 43:
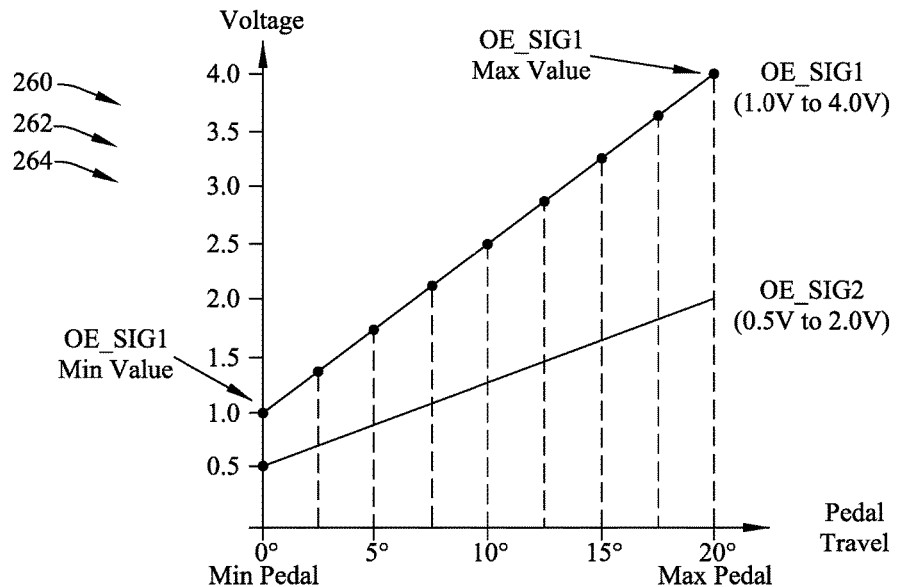
FIG. 43 is a line graph illustrating the first step of the calibration procedure.

FIG. 43 illustrates Calibration Procedure, Step 1: OE_SIG1 MIN, MAX & Sample Points. For the purpose of simplification, this plot shows only 9 sample points (8 spaces). The actual number of sample points will be much higher in real life order to obtain optimal accelerator pedal sensitivity. This is a two channel APS sensor. Multiple channels are required for redundancy.

OE_SIG1 Sampling, (ignition=on, engine not running, first pedal pumping cycle):

Once the calibration sequence is initiated, the installer leaves the pedal in the Idle position. This is the 0 degree position in the chart above. The SCM samples the OE_SIG1 signal. The MIN value is saved.

The installer then gradually pushes the pedal to the MAX position (20 degree position above). The SCM samples the OE_SIG1 MAX signal. The MAX value is saved.

The SCM now calculates the difference between the maximum and minimum OE_SIG1 values. This difference value is divided by the number of desired spaces, or bins. Having more bins result in finer pedal resolution, or better pedal sensitivity. The pedal is now returned to the idle position and the SCM determines the sample points on the OE_SIG1 curve. The green dot is the MIN value; the red dot shows the MAX value.

Figure 44:
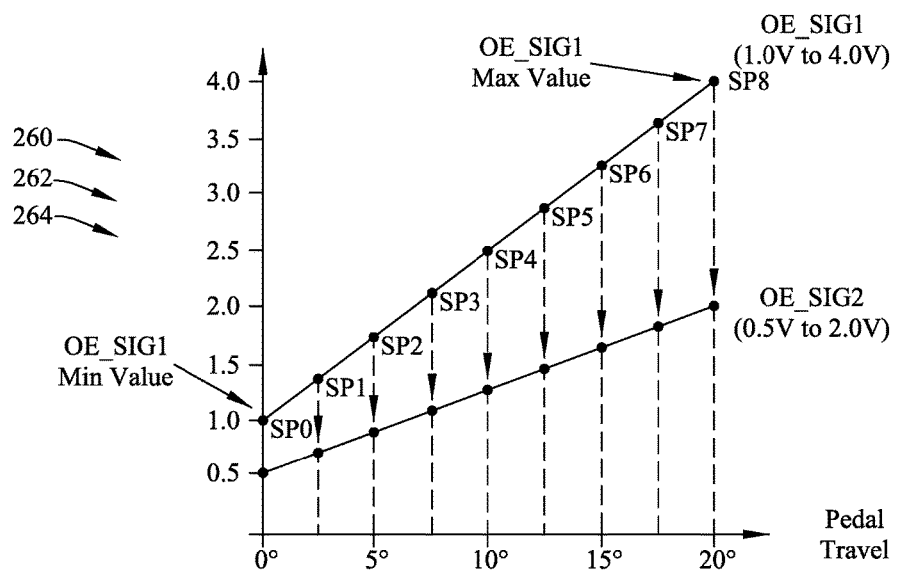
FIG. 44 is a line graph illustrating the second step of the calibration procedure.

FIG. 44 illustrates Calibration Procedure, Step 2: OE_SIG2 Sample Points. OE_SIG2 Sampling, (ignition=on, engine not running, second pedal pumping cycle):

With the OE_SIG1 sample points calculated from Step 1, it is now time to proceed with the second phase of the calibration. In Step 2, the installer gradually presses down on the pedal while the SCM samples the OE_SIG1 signal. Whenever a OE_SIG1 sample point is encountered, the SCM also samples the value of OE_SIG2 and stores the result. This is done for all of the sample points so that every OE_SIG1 sample point has a corresponding OE_SIG2 sample point. The pedal is allowed to return to the idle position. The electrical characterization of the original equipment (OE) pedal is now complete for this multiple channel system. If there was a third channel then this step would be done for channels 2 and 3 at the same time.

Figure 45:
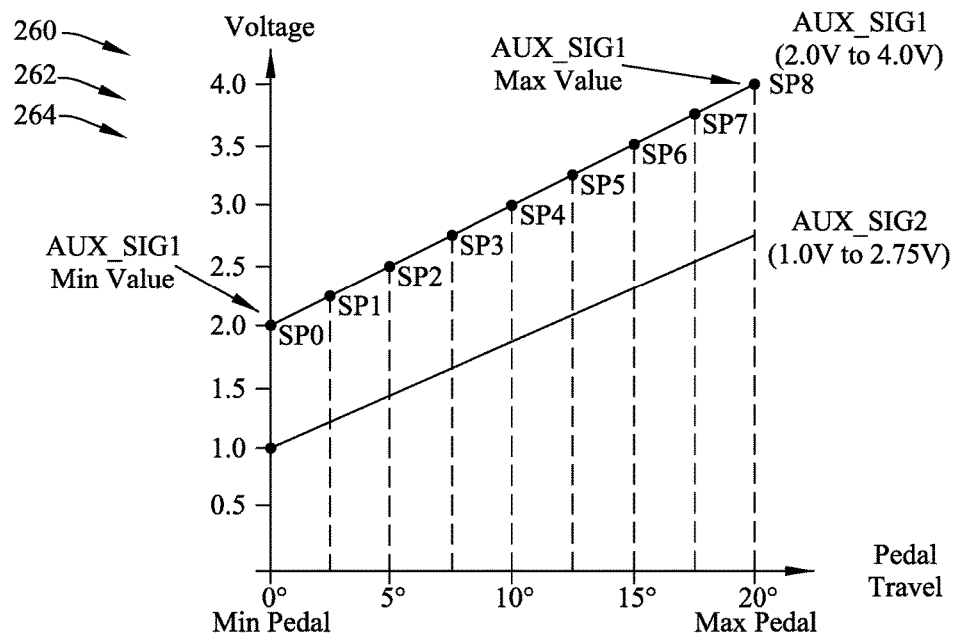
FIG. 45 is a line graph illustrating the third step of the calibration procedure.

FIG. 45 illustrates Calibration Procedure: Step 3, Auxiliary Pedal. This plot shows only 9 sample points (8 spaces). A higher number of sample points will result in greater accelerator pedal sensitivity. This is a two channel APS sensor. Multiple channels are required for redundancy. Note that the signals AUX_SIG1 and AUX_SIG2 are not equivalent to OE_SIG1 and OE_SIG2. It would be a rare event that they would be equal.

AUX_SIG1 Sampling, (ignition=on, engine not running, first pedal pumping cycle):

Once the calibration sequence is initiated, the installer leaves the pedal in the Idle position. This is the 0 degree position in the chart above. The SCM samples the AUX_SIG1 signal. The MIN value is saved.

The installer then gradually pushes the pedal to the MAX position (20 degree position above). The SCM samples the AUX_SIG1 MAX signal. The MAX value is saved.

The SCM now calculates the difference between the maximum and minimum AUX_SIG1 values. This difference is divided by the number of desired spaces, or bins. More bins result in finer pedal resolution, and thus better pedal sensitivity. The pedal is now returned to the idle position and the SCM determines the sample points on the AUX_SIG1 curve. The green dot is the MIN value; the red dot shows the MAX value.

Figure 46:
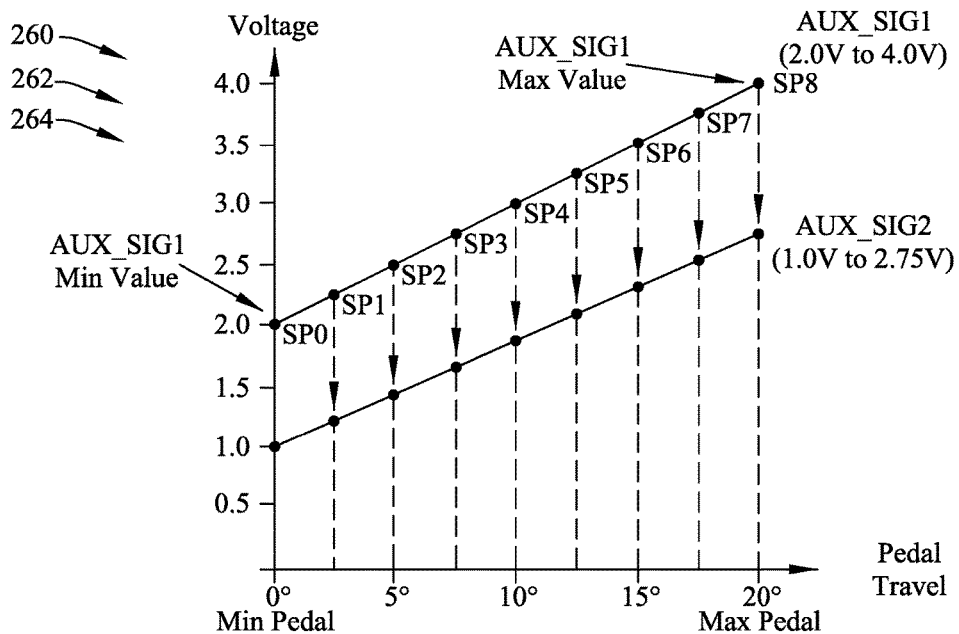
FIG. 46 is a line graph illustrating the fourth step of the calibration procedure.
Figure 47:
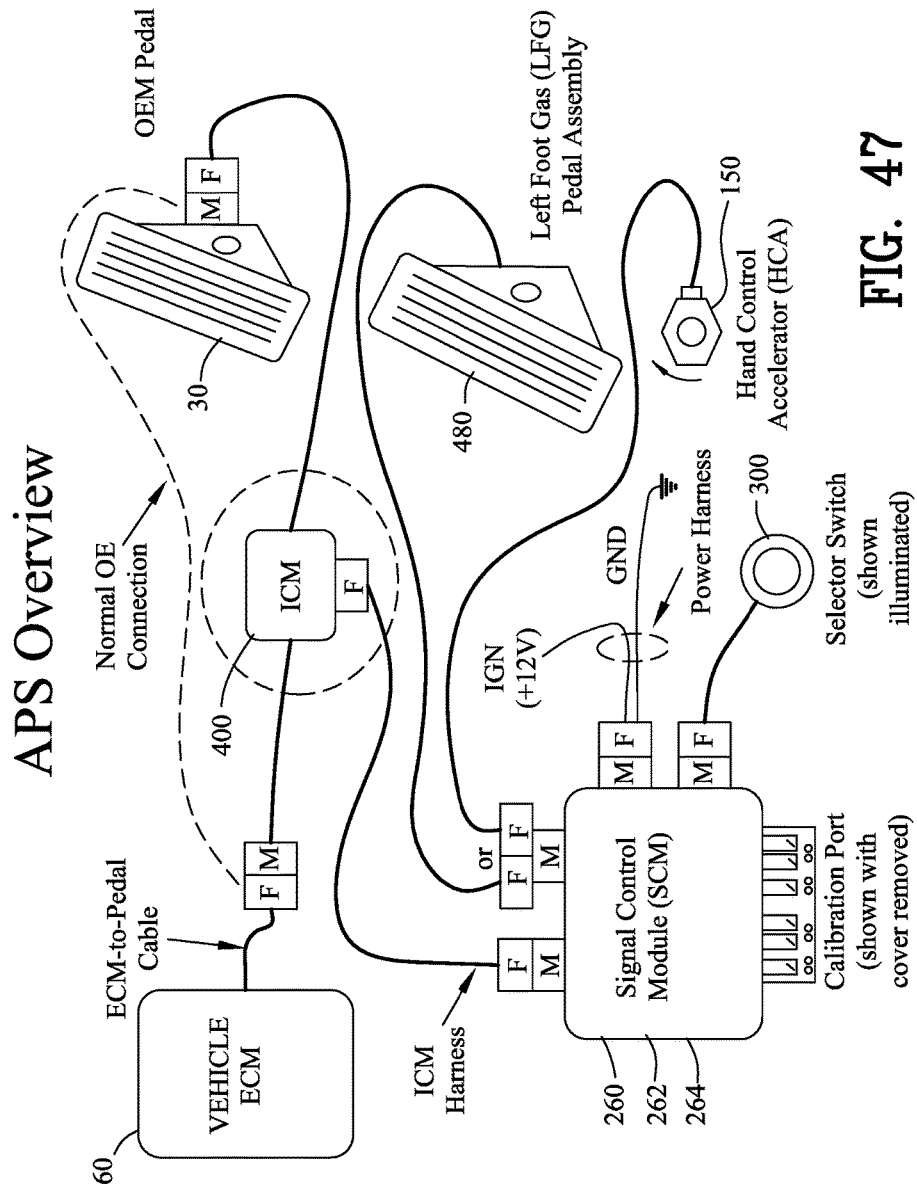
FIG. 47 is a second overview of the accelerating and braking device.

FIG. 46 illustrates Calibration Procedure: Step 4, Auxiliary Pedal. This plot shows only 9 sample points (8 spaces). More sample points provide greater accelerator pedal sensitivity. This shows a two channel APS sensor. Multiple channels are required for redundancy. Note that AUX_SIG1 and AUX_SIG2 are never expected to be equal to the voltage output of OE_SIG1 and OE_SIG2. This unique method of calibrating does not require the auxiliary pedal to be electronically matched to the original equipment pedal.

AUX_SIG2 Sampling, (ignition=on, engine not running, first pedal pumping cycle):

With the AUX_SIG1 sample points calculated from Step 3, it is now time to proceed with the fourth phase of the calibration. In Step 4, the installer gradually presses down on the pedal while the SCM samples the AUX_SIG1 signal. Whenever an AUX_SIG1 sample point is encountered, the SCM also samples the value of AUX_SIG2 and stores the result. This is done for all of the sample points so that for every AUX_SIG1 sample point there is a corresponding AUX_SIG2 sample point. The pedal is allowed to return to the idle position. The electrical characterization of the auxiliary (AUX) pedal is now complete. If there was a third channel, then this step would be done for channels 2 and 3 at the same time.

Figure 48:
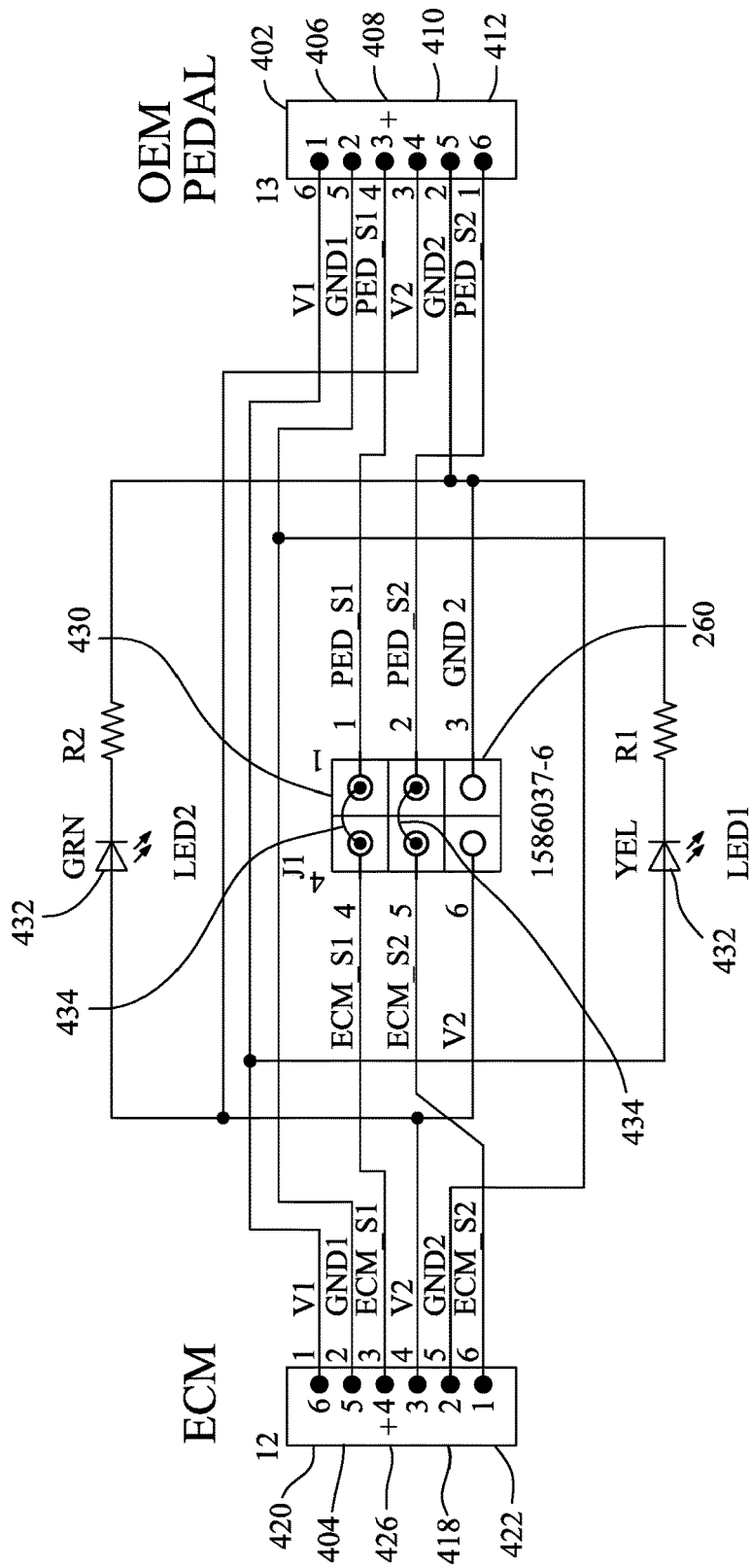
FIG. 48 is a ICM circuit schematic with shorting jumpers.
Figure 49:
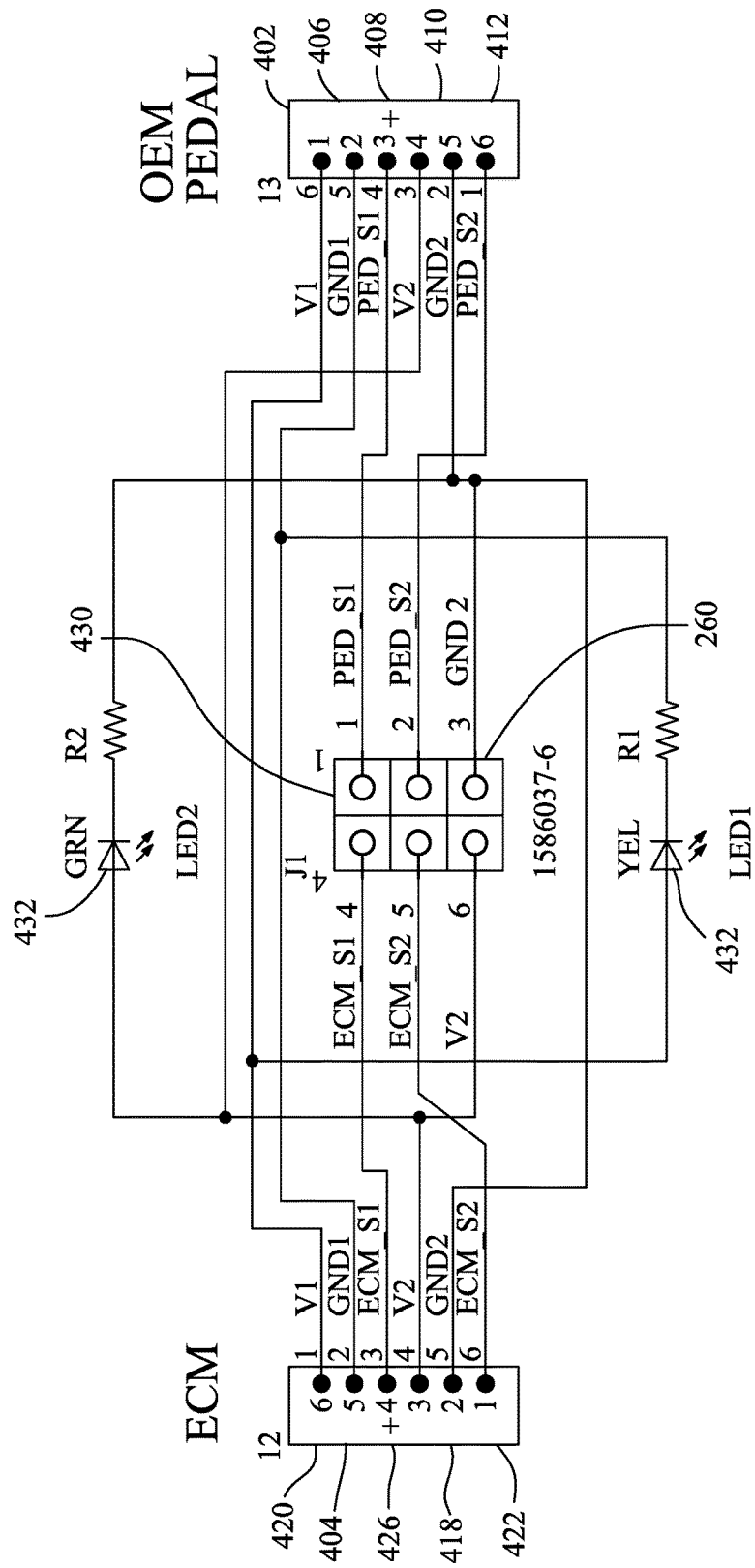
FIG. 49 is a ICM circuit schematic without shorting jumpers.

FIGS. 48 and 49 illustrate an interconnect module 400 (ICM schematic diagram) having an input electrical connection bridge 402 and an output electrical connection bridge 404. An input wiring harness 406 includes an input plug 408 and a plurality of input electrical wires 410. The input plug 408 is electrically coupled to the accelerator pedal 30. The input electrical connection bridge 402 and the plurality of input electrical wires 410 provide a variable input wiring circuit 412.

An output wiring harness 416 includes an output plug 418 and a plurality of output electrical wires 420. The output plug 418 is electrically coupled to the electronic control module 60. The output electrical connection bridge 404 and the plurality of output electrical wires 420 provide a variable output wiring circuit 422.

A coupling electrical connection bridge 430 is electrically coupled with the variable input wiring circuit 412 and the variable output wiring circuit 422. The signal control module 260 is electrically coupled to the coupling electrical connection bridge 430 for completing the circuit between the accelerator pedal 30, through the signal control module 260 and to the electronic control module 60. An illuminating device 432 may be electrically coupled to the interconnect module 400 for verifying the variable input wiring circuit 412.

A temporary electrical jumper 434 engages the coupling electrical connection bridge 430 and bypasses the signal control module 260. The temporary electrical jumper 434 verifies the variable input wiring circuit 412 and the variable output wiring circuit 422 relative to the accelerator pedal 30 and the electronic control module 60. GND1 and GND2 should be shorted with a shorting upper wire connection, but only after they have verified proper wiring and operation using the two LED's.

The Function of the ICM:

The ICM enables complete flexibility in connections between the OEM pedal and the ECM cable. The ICM allows for a method of installing the accelerating and braking device 10 that is highly successful. The ICM has two integrated status LEDs; one is orange and other is green. These stay lit, and do not vary when the OEM pedal is exercised (with the vehicle ignition ON). This indicates a properly connected system. The power correct LEDs show when +5V and ground connections are connected properly.

Test Method: With vehicle ignition on, and the OEM pedal exercised, the brightness of either of these two LEDs should not vary. If they vary, then there is an improper connection at the screw terminals. This must be remedied before the ICM is connected to the SCM using the SCM cable.

With the wires positioned properly, the vehicle will not code, or illuminate the Malfunction Indicator Light (MIL), when the shorting jumper is removed and the ICM is connected to the SCM via the SCM cable.

With so many different types of APC connectors, it is sometimes difficult to know the correct wiring configuration for a particular vehicle. Also, we have the APC assemblies made outside because many different crimping dies are required, and this is impractical. For this reason, APC connectors are supplied to us with wires installed.

Without the ICM, field wiring changes would be very difficult-especially for cases where there are errors in the supplied vehicle wiring straight from the vehicle manufacturer.

Without the ICM, complete harnesses would have to be made. These would be more expensive, more costly to ship, and would be difficult to modify. They could only be modified with splicing and soldering wires.

The ICM eliminates the requirement for solder connections to the OEM ECM cable.

Importance of the ICM in the Installation Process

Important for preparing the initial order.

Enables step-by-step installation that will not code the vehicle.

Critical for diagnosing wiring and connection issues in installation.

It greatly reducing errors in improperly installing the accelerating and braking device 10.

It is crucial for determining if there is a ground isolation problem.

The ICM eliminates the need for cutting into and soldering vehicle wires. This is much more acceptable to the installer.

The ICM eliminates the need for soldering to vehicle wires.

ICM simplifies the installation, making it take less time.

If no ICM was used, the cables to/from the automotive connectors would have to be cut and spliced according to each different wiring configuration. There would have to be more than 50 cable configurations, and this is difficult to manage.

An orange LED lights up when V1 (+5V) and G1 (GND, Signal 1) are connected properly. This ensures the correct power connections for channel 1. A green LED lights up when V2 (+5V) and G2 (GND, Signal 1) are connected properly. This ensures the correct power connections for channel 1. Both orange and green LEDs are on when V1, V2 (+5V) and G1, G2 (ground signals) are connected properly.

This ensures that all correct power connections are good for both channel 1 & 2. Signals S1 & S2 can literally be swapped, so long as the same signal appears directly opposite to it on the other side of the ICM. If both orange and green LEDs are lit the installer can be sure that all the connections are fine. The installer can move on to the signal calibration stage.

The Acceleration Pedal Connectors (APC) are connected via screw terminals.

The APC wired to the left screw terminals connects to the vehicle's ECM.

The APC wired to the right screw terminals connects to vehicle's pedal.

APC's can be wired in various ways, depending on vehicle make and model.

FIG. 48 illustrates the ICM with shorting jumpers. With the shorting jumpers installed, the ICM has a function similar to a junction box. Note: OEM pedal signals PED_S1 and PED_S2 are routed to ECM_S1 and ECM_S2. This is a straight through OEM connection.

Shorting jumpers are important for testing to see if the ICM is configured properly. They prevent the vehicle from coding while the installer tests for the proper configuration of the ICM. For correct configuration the green and yellow LEDs must be solidly lit, and not vary with OEM pedal movement.

FIG. 49 illustrates the ICM without shorting jumpers. Translated SCM signals which originated from the LFG or HCA APS sensor. These signals are directed to the vehicle's ECM (HCA or LFG mode).

These OEM pedal signals are routed to the SCM but they are blocked internally when the system is operating in HCA or LFG mode. The OEM pedal signals are always present on the SCM circuit and can be used for calibration when ignition is on and the OEM pedal is active.

An isolation power supply 450 having an input electrical power source 452 to and an output electrical power source 454. The input electrical power source is electrically coupled to the vehicle electrical system and chassis ground. The output electrical power source is electrically coupled to the signal control module. The input electrical power source has a chassis ground signal 456. The output electrical power source has an electronic control module ground signal 458. The isolation power supply isolating the chassis ground signal and the electronic control module ground signal for permitting the signal control module to utilize the electronic control module ground signal as opposed to the chassis ground signal.

The IPS allows the analog signals from the Acceleration Pedal Sensor (APS) to be translated by the Signal Control Module (SCM) using the analog ground reference of the vehicle's Electronic Control Module (ECM) instead of vehicle's chassis ground, which in some cases, is at a different potential.

The IPS could be either (1) integrated with the SCM, or (2) be external to the ICM (i.e. be off-board). The IPS is a special DC-DC Switching Power Supply where the ground signal of the input side and the output side is galvanically isolated. There is no electrical connection between the ground signal on the input side and the ground signal reference on the output side.

The IPS guarantees that the ground current of the Signal Control Module (SCM) does not flow through the small, internal traces of the ECM. This is especially important in the case where the SCM ground wire is broken or compromised. In this event, SCM ground current would seek ground potential through the ECM signal ground wires, and this has a high likelihood of damaging the internal circuitry of the ECM. Isolates the ECM signal reference ground (G1 and G2) from the power supply of the SCM.

The IPS reduced signal interference issues that result from ground current noise. This allows for more accurate calibration of the SCM because the signals do not jump around as much when one is attempting to calibrate the SCM potentiometers.

Figure 50:
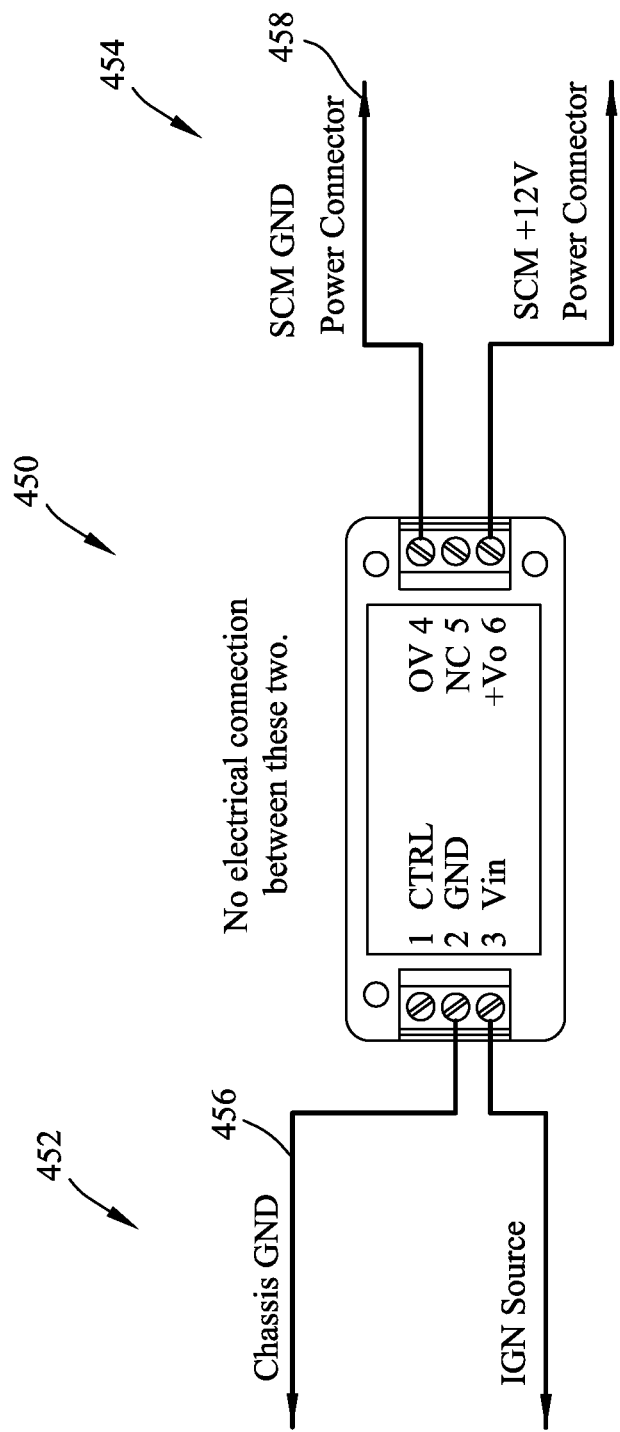
FIG. 50 is an off for isolation power supply circuit schematic.

FIG. 50 is an example of an Off-Board Isolation Power Supply (Isolation DC-DC Switching Power Supply). The RED and BLK wires of the Power Harness are cut and connected as shown in FIG. 50. Preferably 18-22 gauge ferrules are used to terminate the wires at the Isolation Power Source (IPS) screw terminals. An in-line fuse may be installed on the IGN Source side. There are no electrical connection between the chassis GND and the SCM GND power connector.

The control 120 may alternatively include a left foot gas pedal 480 assembly. The accelerating and braking device 10 may utilized an off-the-shelf OEM pedals to connect with the ECM where the OEM pedal IS NOT directly compatible with the vehicle. The OEM pedal can be any two track, redundant APPS model.

The present invention further incorporates a method for accelerating and braking a vehicle. The method comprises the steps of electrically coupling a signal control module 260 between the accelerator pedal 30 and the electronic control module 60. The position sensor 150 is electrically coupled with the signal control module 260. The control 120 is coupled with the position sensor 150 for operating the position sensor 150. The position sensor 150 is calibrated relative to the accelerator pedal 30 with the signal control module 260.

The method further including the steps of rotating the position sensor 150 in a first direction 154 for creating a first variable signal output 156 to the electronic control module 60 and causing an increase in velocity/increase in throttle of the vehicle 12. The position sensor 150 is rotated in a second direction 160 for creating a second variable signal output 162 to the electronic control module 60 and causing a decrease in velocity/decrease in throttle of the vehicle 12.

The method further including the steps of coupling a first spring 200 to the position sensor 150 for rotatably displacing the position sensor 150 in the second rotational displacement 160 and causing the decrease in velocity/decrease in throttle of the vehicle 12. A second spring 210 is coupled to the position sensor 150 for rotatably displacing the position sensor 150 in the second rotational displacement 160 and causing the decrease in velocity/decrease in throttle of the vehicle 12.

The method further including the steps of pivotably coupling a control tube 82 adjacent to the steering column 50. A brake tube 100 is coupled between the control tube 82 and the brake pedal 40.

The method further including the steps of displacing the control tube 82 in a descending direction 102 for causing an activation of the brake pedal 40. The control tube 82 is displaced in an ascending direction 106 for causing a deactivation of the brake pedal 40.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An accelerating and braking device for a vehicle, the vehicle having an accelerator pedal electrically engaging a power system for increasing the velocity of the vehicle and a brake pedal engaging a braking system for decreasing the velocity of the vehicle, a steering column supports a steering wheel for altering the direction of the vehicle, an electronic control module electrically couples to the accelerator pedal with the power system, the accelerating and braking device, comprising:

a support tube coupled adjacent to the steering column;

a control tube extending between a proximal end and a distal end;

a control tube bore extending between said proximal end and said distal end of said control tube;

a control tube pivot pivotably coupling said support tube with said control tube for defining an angular displacement of said control tube relative to said support tube;

a brake tube linking said control tube with the brake pedal;

a descending displacement of said control tube defining a decreasing angular displacement of said control tube relative to said support tube causing an activation of the brake pedal;

an ascending displacement of said control tube defining an increasing angular displacement of said control tube relative to said support tube causing a deactivation of the brake pedal;

a control arm rotatably displaced within said control tube bore;

a control arm handle coupled to said control arm for rotatably displacing said control arm relative to said control tube;

a position sensor coupled to said control tube;

said control arm engaging said position sensor for producing a variable signal output from said position sensor during rotation of said control arm relative to said control tube;

said position sensor electrically coupled to the electronic control module;

a first rotational displacement of said position sensor defining a first variable signal output to the electronic control module for causing an increase in velocity of the vehicle;

a second rotational displacement of said position sensor defining a second variable signal output of said position sensor causing a decrease in velocity of the vehicle;

a first spring engaging said control tube and said control arm for rotatably displacing said control arm relative to said control tube and causing said second rotational displacement and said decrease in velocity of the vehicle; and a second spring engaging said control tube and said control arm for rotatably displacing said control arm relative to said control tube and causing said second rotational displacement and said decrease in velocity of the vehicle.

2. The accelerating and braking device for the vehicle as set forth in claim 1, further including a spring cover sleeve coupled to said control tube;

a spring cover sleeve bore extending into said spring cover sleeve;

said first spring defining a first cylindrical coil spring having a first diameter;

said second spring defining a second cylindrical coil spring having a second diameter;

said first diameter being less than said second diameter for positioning said first spring within said second spring and defining a concentric spring system;

said concentric spring system encircling said control arm and positioned within said spring cover sleeve bore;

a tension adjustment collar having a tension collar bore for receiving said control arm and being rotatably displaced relative to said control tube; and said concentric spring system coupled between said spring cover sleeve and said tension adjustment collar for rotatably displacing said control arm relative to said control tube and causing said second rotational displacement in said decrease in velocity of the vehicle.

3. The accelerating and braking device for the vehicle as set forth in claim 1, further including a pivot stem coupled to said control tube and pivotably coupled to said support tube;

a range collar having a range collar bore for receiving said control arm and being rotatably displacing relative to said control tube;

a first range selector engaging said range collar and contacting said pivot stem for terminating the rotational displacement of said control arm relative to said control tube for said first rotational displacement; and a second range selector engaging said range collar and contacting said pivot stem for terminating the rotational displacement of said control arm relative to said control tube for said second rotational displacement.

4. The accelerating and braking device for the vehicle as set forth in claim 1, further including a signal control module electrically coupled between said position sensor and the electronic control module of the vehicle; and said signal control module electrically calibrating said first variable signal output of said first rotational displacement and said second variable signal output of said second rotational displacement.

5. The accelerating and braking device for the vehicle as set forth in claim 4, further including a selector switch electrically coupled to said signal control module; and said selector switch alternatively electrically coupling the accelerator pedal or said position sensor for increasing the velocity of the vehicle.

6. The accelerating and braking device for the vehicle set forth in claim 4, wherein said signal control module includes manual solid-state electrical components for calibrating said first variable signal output of said first rotational displacement and said second variable signal output of said second rotational displacement.

7. The accelerating and braking device for the vehicle as set forth in claim 4, wherein said signal control module includes a microprocessor for calibrating said first variable signal output of said first rotational displacement and said second variable signal output of said second rotational displacement.

8. The accelerating and braking device for the vehicle as set forth in claim 4, further including a brake switch electrically coupled to said signal control module;

said brake switch defining a non-activation condition during the brake pedal being not engaged;

said brake switch defining an activation condition during said brake pedal being engaged;

said activation condition causing said signal control module to produce said second variable signal output of said position sensor regardless of said first variable signal output; and said activation condition decreasing the velocity of the vehicle.

9. The accelerating and braking device for the vehicle as set forth in claim 4, further including a brake switch electrically coupled to said signal control module;

said brake switch defining a first non-activation condition during the brake pedal being not engaged;

said brake switch defining a first activation condition during said brake pedal being engaged;

a vehicle speed sensor electrically coupled to said signal control module;

said vehicle speed sensor defining a second non-activation condition during the vehicle having a velocity below a stored value;

said vehicle speed sensor defining a second activation condition during the vehicle having a velocity above a stored value;

said first activation condition and said second activation condition causing said signal control module to produce said second variable signal output of said position sensor regardless of said first variable signal output;

said first activation condition and said second activation condition decreasing the velocity of the vehicle; and said first activation condition and said second non-activation condition not decreasing the velocity of the vehicle.

10. The accelerating and braking device for the vehicle as set forth in claim 4, further including a brake switch electrically coupled to said signal control module;

said brake switch defining a first non-activation condition during the brake pedal being not engaged;

said brake switch defining a first activation condition during said brake pedal being engaged;

said first activation condition causing said signal control module to produce said second variable signal output of said position sensor regardless of said first variable signal output;

said first activation condition decreasing the velocity of the vehicle;

a brake throttle override switch electrically coupled to said signal control module;

said brake throttle override switch defining a second non-activation condition during said brake throttle override switch being not engaged;

said brake throttle override switch defining a second activation condition during said brake throttle override switch being engaged; and said second activation condition causing said signal control module to negate said first activation condition for permitting both the application of the braking system and the power system for a period of time.

11. The accelerating and braking device for the vehicle as set forth in claim 4, further including a pedal sensitivity switch electrically coupled to said signal control module;

a pedal sensitivity data in said signal control module;

said pedal sensitivity switch defining a non-activation condition for providing a non-altered said first variable signal output to the electronic control module and causing an non-altered increase in velocity of the vehicle;

said pedal sensitivity switch defining an activation condition for activating said pedal sensitivity data; and said pedal sensitivity data providing an altered said first variable signal output to the electronic control module and causing a reduced increase in velocity of the vehicle.

12. The accelerating and braking device for the vehicle as set forth in claim 4, further including an interconnect module having an input electrical connection bridge and a output electrical connection bridge;
   an input wiring harness including an input plug and a plurality of input electrical wires;
   said input plug electrically coupled to the accelerator pedal;
   said input electrical connection bridge and said plurality of input electrical wires providing a variable input wiring circuit;
   an output wiring harness including an output plug and a plurality of output electrical wires;
   said output plug electrically coupled to the electronic control module;
   said output electrical connection bridge and said plurality of output electrical wires providing a variable output wiring circuit;
   a coupling electrical connection bridge electrically coupled with said variable input wiring circuit and said variable output wiring circuit; and
   said signal control module electrically coupled to said coupling electrical connection bridge for completing the circuit between the accelerator pedal, through said signal control module and to the electronic control module.

13. The accelerating and braking device for the vehicle as set forth in claim 12, further including an illuminating device electrically coupled to said interconnect module for verifying said variable input wiring circuit.

14. The accelerating and braking device for the vehicle as set forth in claim 12, further including a temporary electrical jumper engaging said coupling electrical connection bridge and bypassing said signal control module; and
   said temporary electrical jumper verifying said variable input wiring circuit and said variable output wiring circuit relative to the accelerator pedal and the electronic control module.

15. The accelerating and braking device for the vehicle as set forth in claim 4, further including an isolation power supply having an input electrical power source and an output electrical power source;
   said input electrical power source electrically coupled to the vehicle electrical system and chassis ground;
   said output electrical power source electrically coupled to said signal control module;
   said input electrical power source having a chassis ground signal;
   said output electrical power source having an electronic control module ground signal;
   said isolation power supply isolating said chassis ground signal and said electronic control module ground signal for permitting said signal control module to utilize said electronic control module ground signal as opposed to said chassis ground signal.

16. An accelerating and braking device for a vehicle, the vehicle having an accelerator pedal electrically engaging a power system for increasing the velocity of the vehicle and a brake pedal engaging a braking system for decreasing the velocity of the vehicle, a steering column supports a steering wheel for altering the direction of the vehicle, an electronic control module electrically couples to the accelerator pedal with the power system, the accelerating and braking device, comprising:
   a control linkage extending between a proximal end and a distal end;
   a control linkage pivot pivotably coupling said control linkage with the steering column for defining an angular displacement of said control linkage relative to the steering column;
   a brake tube linking said control linkage with the brake pedal;
   a descending displacement of said control linkage defining a decreasing angular displacement of said control linkage relative to said support linkage causing an activation of the brake pedal;
   an ascending displacement of said control linkage defining an increasing angular displacement of said control linkage relative to the steering column causing a deactivation of the brake pedal;
   a control arm engaging said control linkage;
   a position sensor coupled to said control linkage;
   said control arm engaging said position sensor for producing a variable signal output from said position sensor during rotation of said control arm relative to said control linkage;
   said position sensor electrically coupled to the electronic control module;
   a first rotational displacement of said position sensor defining a first variable signal output to the electronic control module for causing an increase in velocity of the vehicle;
   a second rotational displacement of said position sensor defining a second variable signal output of said position sensor causing a decrease in velocity of the vehicle;
   a first spring engaging said control linkage and said control arm for rotatablydisplacing said control arm relative to said control linkage and causing said second rotational displacement and said decrease in velocity of the vehicle; and
   a second spring engaging said control linkage and said control arm for rotatablydisplacing said control arm relative to said control linkage and causing said second rotational displacement and said decrease in velocity of the vehicle.

17. The accelerating and braking device for the vehicle as set forth in claim 16, further including a signal control module electrically coupled between said position sensor and the electronic control module of the vehicle; and
   said signal control module electrically calibrating said first variable signal output of said first rotational displacement and said second variable signal output of said second rotational displacement.

18. The accelerating and braking device for the vehicle as set forth in claim 17, further including a selector switch electrically coupled to said signal control module; and
   said selector switch alternatively electrically coupling the accelerator pedal or said position sensor for increasing the velocity of the vehicle.

19. The accelerating and braking device for the vehicle as set forth in claim 17, further including a left foot gas pedal assembly;
   a selector switch electrically coupled to said signal control module; and
   said selector switch alternatively electrically coupling said left foot gas pedal or said position sensor for increasing the velocity of the vehicle.

20. The accelerating and braking device for the vehicle as set forth in claim 17, further including an interconnect module having an input electrical connection bridge and a output electrical connection bridge;
   an input wiring harness including an input plug and a plurality of input electrical wires;

said input plug electrically coupled to the accelerator pedal;

said input electrical connection bridge and said plurality of input electrical wires providing a variable input wiring circuit;

an output wiring harness including an output plug and a plurality of output electrical wires;

said output plug electrically coupled to said electronic control module;

said output electrical connection bridge and said plurality of output electrical wires providing a variable output wiring circuit;

a coupling electrical connection bridge electrically coupled with said variable input wiring circuit and said variable output wiring circuit; and said signal control module electrically coupled to said coupling electrical connection bridge for completing the circuit between the accelerator pedal, through said signal control module and to the electronic control module.

21. The accelerating and braking device for the vehicle as set forth in claim 20, further including an illuminating device electrically coupled to said interconnect module for verifying said variable input wiring circuit.

22. The accelerating and braking device for the vehicle as set forth in claim 20, further including a temporary electrical jumper engaging said coupling electrical connection bridge and bypassing said signal control module; and said temporary electrical jumper verifying said variable input wiring circuit and said variable output wiring circuit relative to the accelerator pedal and the electronic control module.

23. An accelerating and braking device for a vehicle, the vehicle having an accelerator pedal electrically engaging a power system for increasing the velocity of the vehicle and a brake pedal engaging a braking system for decreasing the velocity of the vehicle, a steering column supports a steering wheel for altering the direction of the vehicle, an electronic control module electrically couples to the accelerator pedal with the power system, the accelerating and braking device, comprising:

a control tube extending between a proximal end and a distal end;

a control tube bore extending between said proximal end and said distal end of said control tube;

a control tube pivot pivotably coupling said control tube with the steering column for defining an angular displacement of said control tube relative to the steering column;

a brake tube linking said control tube with the brake pedal;

a descending displacement of said control tube defining a decreasing angular displacement of said control tube relative to said support tube causing an activation of the brake pedal;

an ascending displacement of said control tube defining an increasing angular displacement of said control tube relative to said support tube causing a deactivation of the brake pedal;

a control arm rotatably displaced within said control tube bore;

a position sensor coupled to said control tube;

said control arm engaging said position sensor for producing a variable signal output from said position sensor during rotation of said control arm relative to said control tube;

said position sensor electrically coupled to the electronic control module;

a first rotational displacement of said position sensor defining a first variable signal output to the electronic control module for causing an increase in velocity of the vehicle;

a second rotational displacement of said position sensor defining a second variable signal output of said position sensor causing a decrease in velocity of the vehicle;

a first spring engaging said control tube and said control arm for rotata bly displacing said control arm relative to said control tube and causing said second rotational displacement and said decrease in velocity of the vehicle; and a second spring engaging said control tube and said control arm for rotatably displacing said control arm relative to said control tube and causing said second rotational displacement and said decrease in velocity of the vehicle.

* * * * *